United States Patent
Duan et al.

(10) Patent No.: US 12,416,703 B2
(45) Date of Patent: Sep. 16, 2025

(54) TIME REVERSAL FOR RADIO FREQUENCY SENSING

(71) Applicant: QUALCOMM Incorporated, San Diego, CA (US)

(72) Inventors: Weimin Duan, San Diego, CA (US); Hyojin Lee, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 75 days.

(21) Appl. No.: 18/241,267

(22) Filed: Sep. 1, 2023

(65) Prior Publication Data
US 2025/0076449 A1    Mar. 6, 2025

(51) Int. Cl.
*G01S 5/06* (2006.01)
*H04B 7/0456* (2017.01)
*H04L 5/00* (2006.01)

(52) U.S. Cl.
CPC .............. *G01S 5/06* (2013.01); *H04B 7/0456* (2013.01); *H04L 5/0048* (2013.01)

(58) Field of Classification Search
CPC .......... G01S 5/06; G01S 13/04; G01S 5/0273; G01S 5/0036; G01S 13/003; H04L 5/0048; H04L 5/0051; H04W 64/00
See application file for complete search history.

(56) References Cited

U.S. PATENT DOCUMENTS

| | | | |
|---|---|---|---|
| 9,083,350 B1* | 7/2015 | Posner | H03L 7/0816 |
| 2009/0076389 A1* | 3/2009 | Jin | G01S 13/904 |
| | | | 382/128 |
| 2016/0277166 A1* | 9/2016 | Liu | H04L 25/03006 |
| 2017/0026147 A1* | 1/2017 | Smith | G01S 13/878 |
| 2021/0092558 A1* | 3/2021 | Duan | H04L 25/03343 |
| 2022/0104111 A1* | 3/2022 | Zorgui | G01S 13/04 |
| 2023/0003867 A1* | 1/2023 | Yehezkel | G01S 7/354 |
| 2023/0152422 A1* | 5/2023 | He | G01S 7/285 |
| | | | 342/195 |
| 2024/0283513 A1* | 8/2024 | Bi | H04B 7/063 |

FOREIGN PATENT DOCUMENTS

WO    WO-2022012650 A1 *   1/2022    ......... H04B 17/345

OTHER PUBLICATIONS

IEEE 100, The Authoritative Dictionary of IEEE Standards Terms, Seventh Edition, 2000 (Year: 2000).*
Dan Jacobellis, Matched Filtering, EE 445S, Nov. 8, 2021 (Year: 2021).*

(Continued)

*Primary Examiner* — Aristocratis Fotakis
(74) *Attorney, Agent, or Firm* — SUNSTEIN LLP

(57) ABSTRACT

Techniques are provided for utilizing time reversed reference signals for radio frequency (RF) sensing operations. An example method for performing radio frequency sensing operations includes transmitting a radio frequency reference signal, receiving channel information associated with the radio frequency reference signal, generating a time reversed radio frequency sensing signal based at least in part on the channel information, and transmitting the time reversed radio frequency sensing signal.

16 Claims, 21 Drawing Sheets

(56) References Cited

OTHER PUBLICATIONS

CATT: "Feature Lead Summary on AI 7.2.4.3 Sidelink Synchronization Mechanism", 3GPP TSG RAN WG1 Meeting #99, R1-1913465, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, pp. 1-45, Nov. 25, 2019, XP051830743, Sections 3.2-3.4.
International Search Report and Written Opinion—PCT/US2024/041244—ISA/EPO—Oct. 25, 2024.
Jin Y., et al., "Time Reversal in Multiple-Input Multiple-Output Radar", IEEE Journal of Selected Topics in Signal Processing, IEEE, US, vol. 4, No. 1, Feb. 1, 2010, pp. 210-225, XP011300234, Sections I-IV.
Thoma R.S., et al., "Characterization of Multi-Link Propagation and Bistatic Target Reflectivity for Distributed ISAC", arXiv: 2210.11840v1 [eess.SP], Cornell University Library, 201 Olin Library Cornell University Ithaca, NY 14853, Oct. 21, 2022, XP091350187, Sections I-III, figures 1-5,7, 6 Pages.
Zhang J., et al., "Distance Estimation and Pairing for Low Angle Group Targets Based on Radar Time Reversal", Digital Signal Processing, Academic Press, Orlando, FL, US, vol. 106, Jul. 15, 2020, XP086271560, Abstract, Sections 1-3, figures 1,2, pp. 1-13.

\* cited by examiner

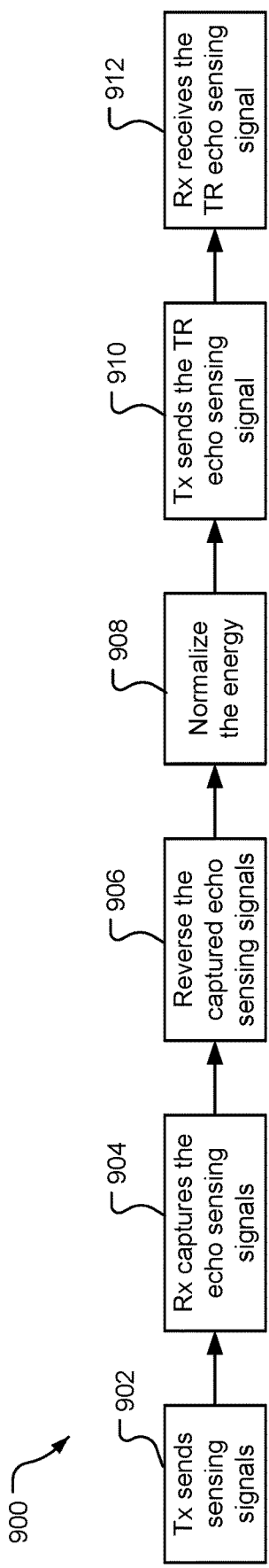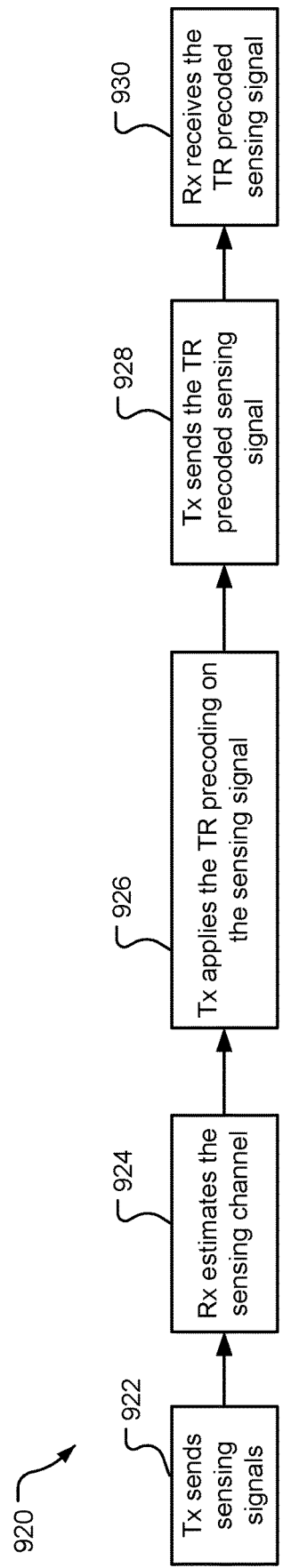
FIG. 9A
FIG. 9B

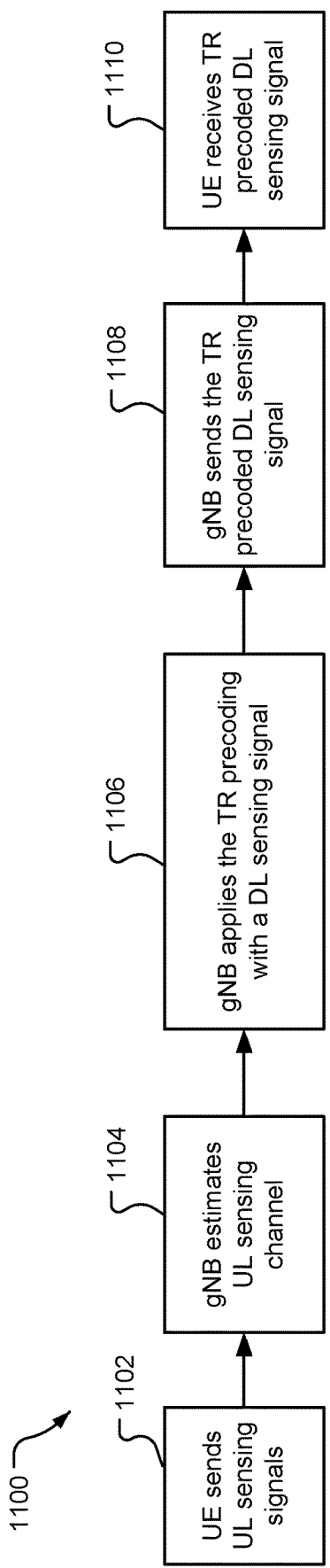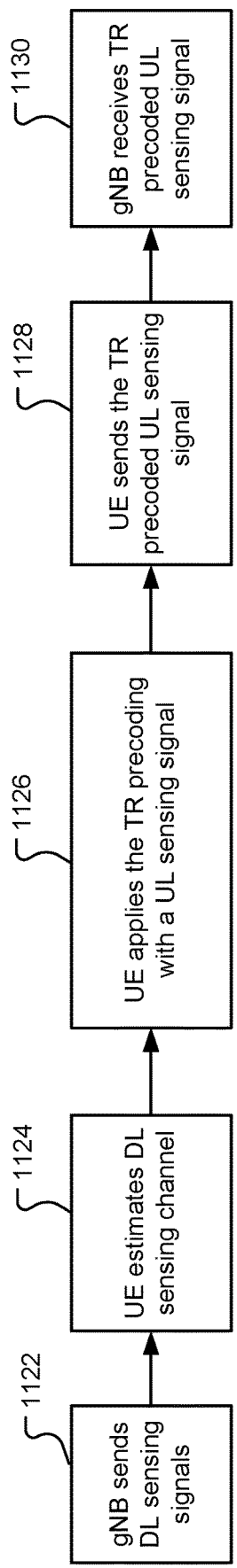
FIG. 11A
FIG. 11B

TIME REVERSAL FOR RADIO FREQUENCY SENSING

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

5G enables the utilization of RF signals for wireless communication between network nodes, such as base stations, user equipment (UEs), vehicles, factory automation machinery, and the like. However, the RF signals may also be used for RF sensing applications such as autonomous driving, intruder detection, gesture recognition, beam management, and other macro and micro sensing applications. Detecting and tracking objects with RF sensing may be degraded due to multipath propagation of the RF signals.

SUMMARY

An example method for transmitting a time reversed radio frequency sensing signal during monostatic radio frequency sensing operations according to the disclosure includes transmitting a radio frequency sensing signal, receiving an echo of the radio frequency sensing signal, reversing the echo of the radio frequency sensing signal received, normalizing an energy of a reversed echo of the radio frequency sensing signal, and transmitting a normalized reversed echo of the radio frequency sensing signal.

An example method for transmitting a radio frequency sensing signal based on a time reversal precoding according to the disclosure includes receiving a radio frequency reference signal, determining a time reversing precoding based on a channel associated with the radio frequency reference signal, generating a time reversed radio frequency sensing signal based at least in part on the time reversing precoding, and transmitting the time reversed radio frequency sensing signal.

An example method for performing radio frequency sensing operations according to the disclosure includes transmitting a radio frequency reference signal, receiving channel information associated with the radio frequency reference signal, generating a time reversed radio frequency sensing signal based at least in part on the channel information, and transmitting the time reversed radio frequency sensing signal.

Items and/or techniques described herein may provide one or more of the following capabilities, as well as other capabilities not mentioned. A wireless node may be capable of transmitting and/or receiving radio frequency (RF) sensing signals. The wireless node may utilize the same receivers for both communications and RF sensing operations. Channel information may be obtained for one or more channels utilized for RF sensing operations. Time reversing filters may be generated based on the channel information. Network entities may be configured to provide the channel information, and RF sensing signals may be time reversed based on the time reversing filters. The wireless nodes may be configured to transmit time reversed RF sensing signals. The time reversed RF sensing signals may compress multipath signals in the channel. The signal-to-noise ratio for detected targets may increase. The time reversed sensing signals may be implemented to increase target detection and tracking performance of the wireless nodes. Other capabilities may be provided and not every implementation according to the disclosure must provide any, let alone all, of the capabilities discussed.

BRIEF DESCRIPTION OF THE DRAWINGS

FIG. 9A is an example process flow for monostatic RF sensing with a time reversed RF sensing signal.

FIG. 9B is an example process flow for monostatic RF sensing with a time-reversal filter applied to a RF sensing signal.

FIGS. 11A and 11B are example process flows for bistatic RF sensing with time reversed RF signals based on explicit channel estimation.

DETAILED DESCRIPTION

Figure 1:
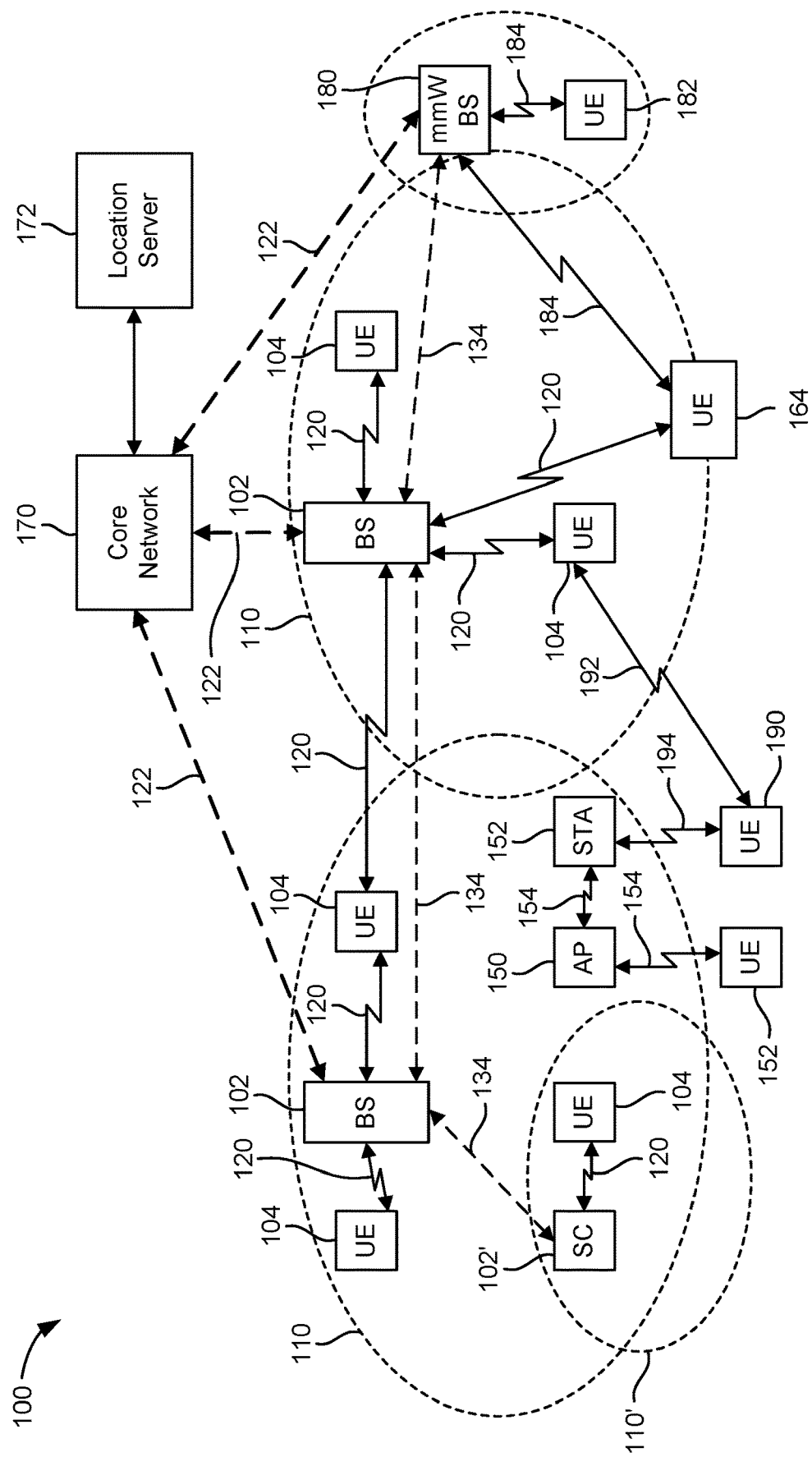
FIG. 1 illustrates an example wireless communications system.

Techniques are provided herein for utilizing time reversed reference signals for radio frequency (RF) sensing operations. In general, RF sensing may be regarded as consumer-level radar with advanced detection capabilities. For example, RF sensing may be used in applications such as health monitoring (e.g., heartbeat detection, respiration rate monitoring, etc.), gesture recognition (e.g., human activity recognition, keystroke detection, sign language recognition), contextual information acquisition (e.g., location detection/tracking, direction finding, range estimation), automotive radar (e.g., smart cruise control, collision avoidance) and the like. Due to the increased bandwidth allocations for cellular communications systems (e.g., 5G and beyond), and the development of more use cases for cellular communications, capabilities for integrated RF sensing and communication applications may be a requirement for future cellular systems.

Time reversed RF sensing signals may be utilized to reduce the impact of multipath propagation on object detection and tracking. The multipath propagation may increase the clutter of the received RF sensing signals due to the background scattering of the transmitted RF signals. RF sensing based target detection and parameter estimation may be impacted by the multipath propagation. Such multipath propagation may be unavoidable for some cellular RF sensing scenarios, such as urban areas and indoor environments. In a low signal-to-noise (SNR) range, the target related paths with low power may not be successfully detected by a receiver. The signal power spread may lead to per channel tap SNR drop, which may make the target detection more challenging in multipath rich environments. For example, a RF sensing receiver may receive return signals via multiple paths for a single target object. The multipath effects could degrade target detection and tracking performance because of the corresponding signal power spread and the per channel tap SNR drop. Further, ghost targets may be generated based on multiple bounces in the propagation path. The techniques provided herein may be implemented to enhance target detection in a multipath channel under low SNR conditions. In the techniques described herein, time reversal RF sensing may be applied in position/location determination. Time reversal RF sensing may be time reversal-based mono-static sensing, or time reversal-based multi-static sensing. In an example, the time reversal RF sensing may be performed with a beat signal.

Particular aspects of the subject matter described in the disclosure may be implemented to realize one or more of the following potential advantages. Time reversed RF sensing signals may be generated and transmitted to reduce the impact of the multipath effects. The time reversed signals may be generated based on receiving a RF sensing signal, time reversing the received signal, and transmitting the time reversed signal. The time reversed RF sensing signal may be generated based on known or estimated channel conditions. For example, a time reversal filter may be based on a time reversed channel impulse response (CIR). A transmitter may be configured to utilize the time reversal filter (e.g., precoder) to transmit a time reversed RF sensing signal. The time reversal may compress the multipath channel and increase the SNR for target detection and tracking performance. The time reversed RF sensing signals may be utilized for monostatic and bistatic (i.e., multistatic) RF sensing operations. Network entities, such as mobile devices, base stations and network servers, may be configured to provide channel estimation information to enable the generation of time reversed RF sensing signals. The network entities may also be configured to detect changes in channel conditions which may impact the effectiveness of the time reversed signals. For example, loss of channel reciprocity due to a time gap between an RF sensing signal and an echo signal may be lost. The network entities may be configured to provide assistance data including resource allocation to enable devices to utilize time reversed RF sensing signals. Mobile devices, such as user equipment (UE), may be configured to provide RF sensing capabilities information including an indication of an ability to perform time reversal precoding. The network may configure time reversal precoding based in part on the capabilities of the UE. These techniques and configurations are examples, and other techniques and configurations may be used.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary," and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" (BS) are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Referring to FIG. 1, an example wireless communications system 100 is shown. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STA 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHZ unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHZ, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHZ), FR3 (above 52600 MHZ), and FR4 (between FR1 and FR2). In a multi-carrier system, such as 5G, one of the carrier frequencies is referred to as the "primary carrier" or "anchor carrier" or "primary serving cell" or "Pcell," and the remaining carrier frequencies are referred to as "secondary carriers" or "secondary serving cells" or "Scells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a Pcell or an Scell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "Pcell") and other frequencies utilized by the macro cell base stations 102 and/or the mmW base station 180 may be secondary carriers ("Scells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over communication links 120 and/or the mmW base station 180 over a mmW communication link 184. For example, the macro cell base station 102 may support a Pcell and one or more Scells for the UE 164 and the mmW base station 180 may support one or more Scells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
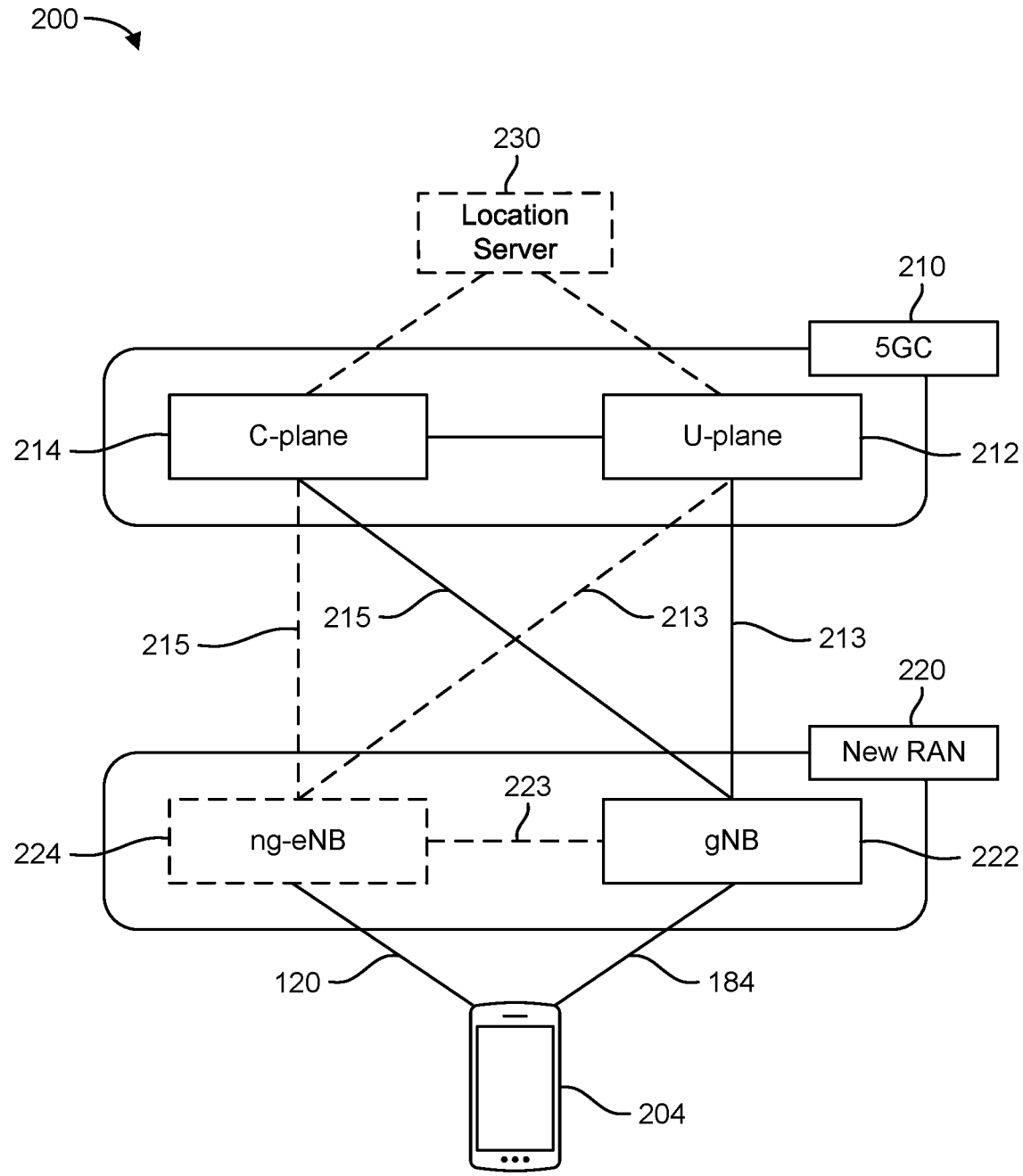
FIGS. 2A and 2B illustrate example wireless network structures.

Referring to FIG. 2A, an example wireless network structure 200 is shown. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
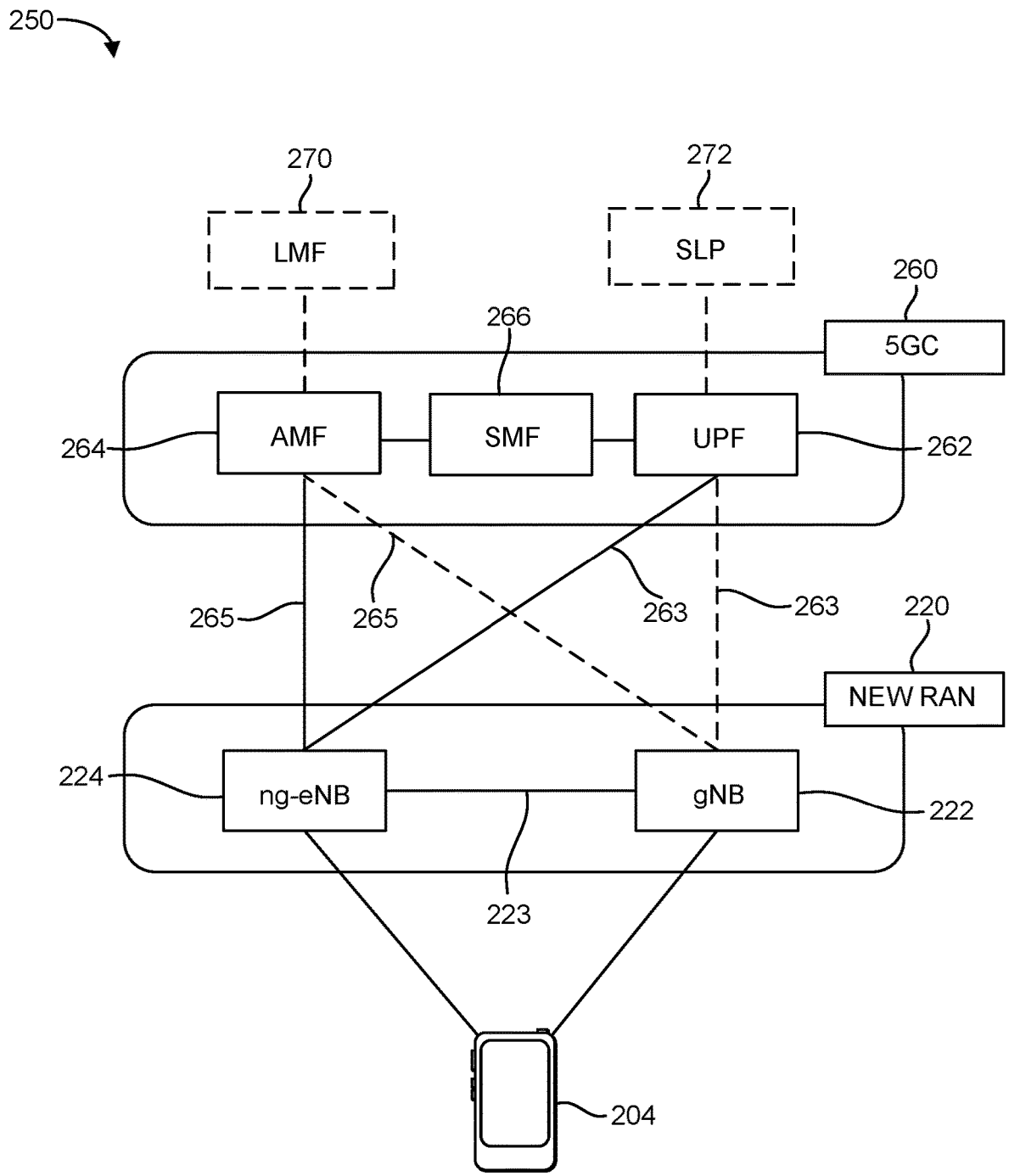

Referring to FIG. 2B, another example wireless network structure 250 is shown. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated into a base station, such as the gNB 222 and/or the ng-eNB 224. When integrated into the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3A:
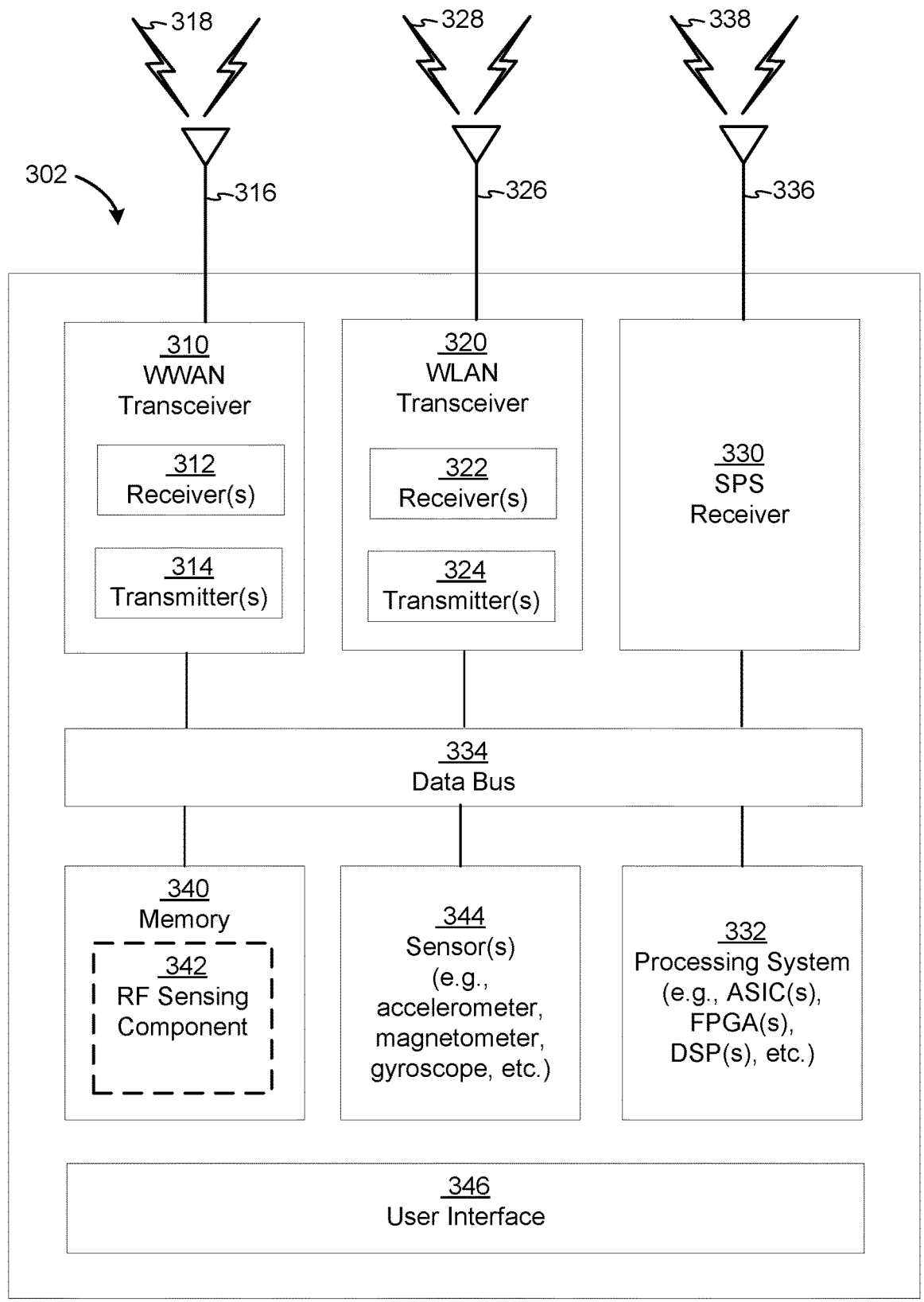
FIGS. 3A to 3C are simplified block diagrams of several sample components that may be employed in wireless communication nodes and configured to support communication and radio frequency sensing.
Figure 3B:
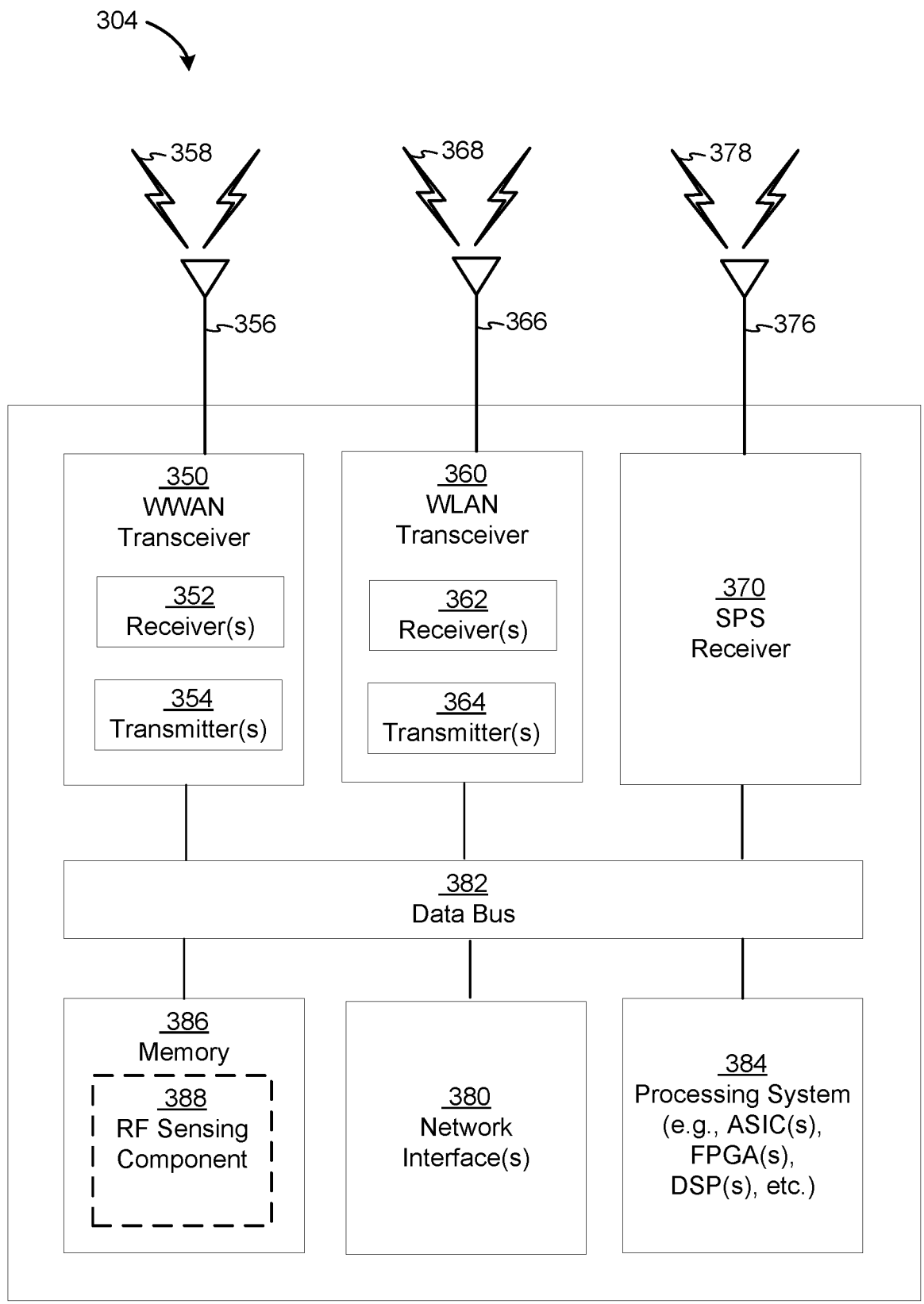
Figure 3C:
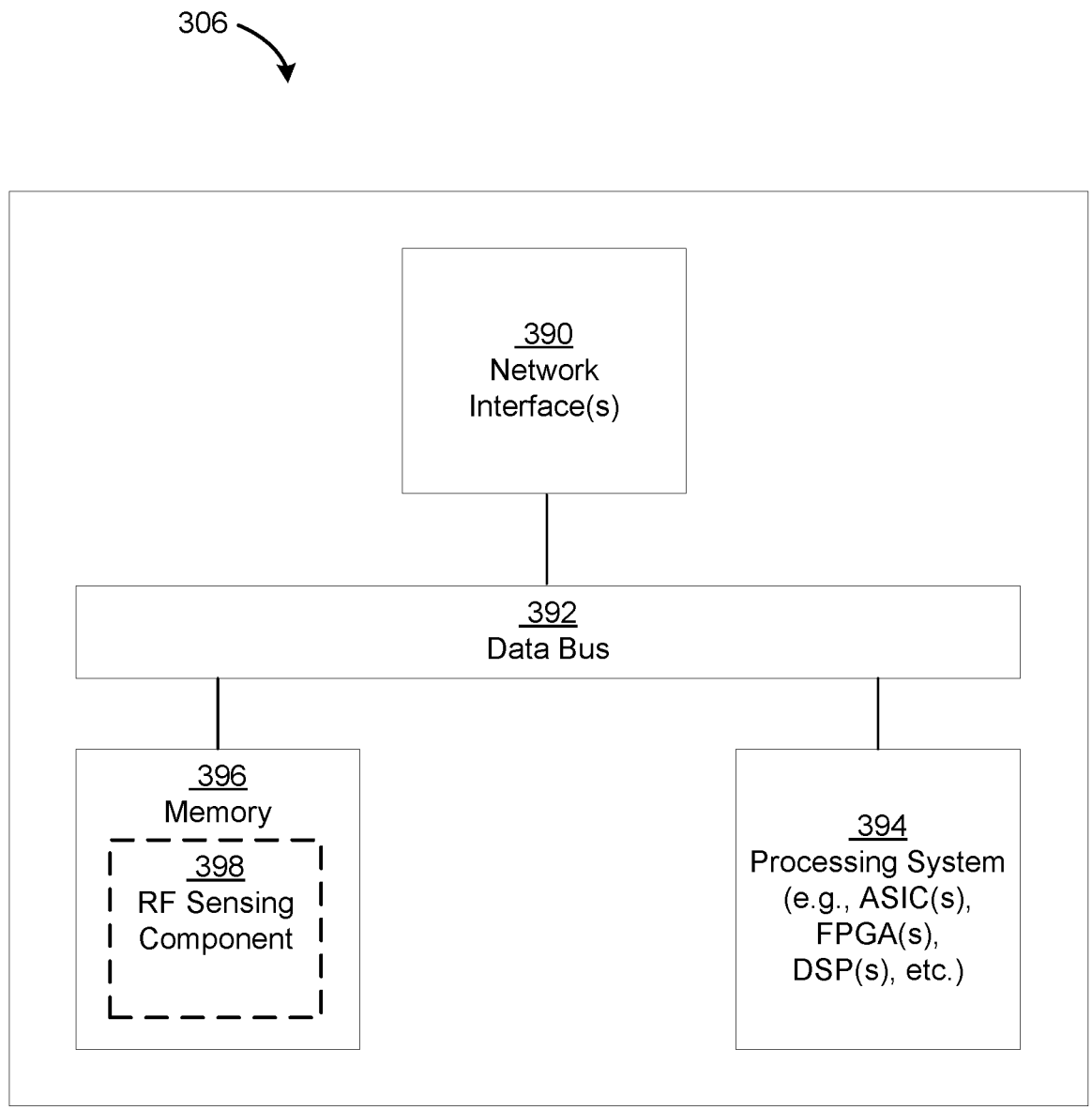

Referring to FIGS. 3A, 3B and 3C, several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations are shown. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, joint communication and RF sensing (i.e., integrated sensing and communications (ISAC) operations), and for providing other processing functionality. The base station 304 includes a processing system 384 for providing functionality relating to, for example, ISAC operations as disclosed herein, and for providing other processing functionality. The network entity 306 includes a processing system 394 for providing functionality relating to, for example, ISAC operations as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include RF sensing components 342, 388, and 398, respectively. The RF sensing components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the RF sensing components 342, 388, and 398 may be external to the processing systems 332, 384, and 394 (e.g., part of a modem processing system, integrated with another processing system, etc.). Alternatively, the RF sensing components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such as a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by components 310 to 346 may be implemented by processor and memory component(s) of the UE 302 (e.g., by execution of appropriate code and/or by appropriate configuration of processor components). Similarly, some or all of the functionality represented by components 350 to 388 may be implemented by processor and memory component(s) of the base station 304 (e.g., by execution of appropriate code and/or by appropriate configuration of processor components). Also, some or all of the functionality represented by components 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the RF sensing components 342, 388, and 398, etc.

Wireless communication signals (e.g., RF signals configured to carry OFDM symbols) transmitted between a UE and a base station can be reused for environment sensing (also referred to as "RF sensing" or "radar"). Using wireless communication signals for environment sensing can be regarded as consumer-level radar with advanced detection capabilities that enable, among other things, touchless/device-free interaction with a device/system. The wireless communication signals may be cellular communication signals, such as LTE or NR signals, WLAN signals, etc. As a particular example, the wireless communication signals may be an OFDM waveform as utilized in LTE and NR. High-frequency communication signals, such as mmW RF signals, are especially beneficial to use as radar signals because the higher frequency provides, at least, more accurate range (distance) detection.

Figure 4A:
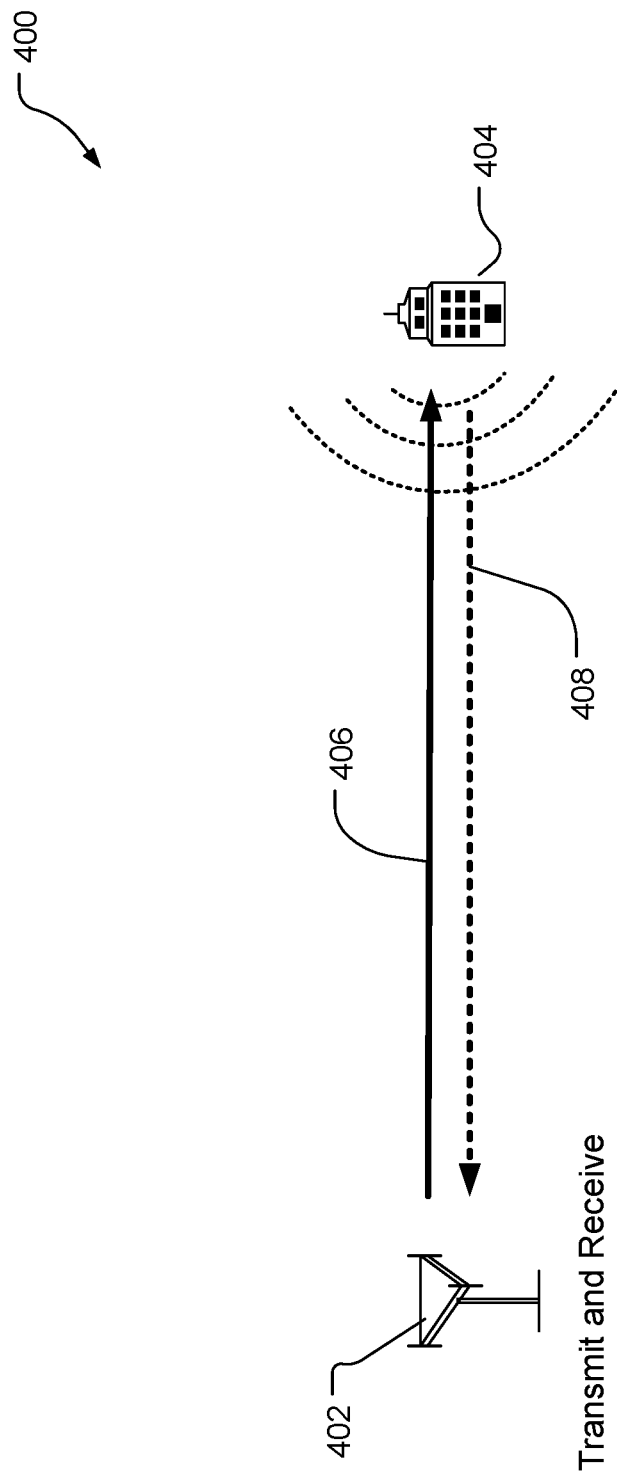
FIG. 4A illustrates an example monostatic RF sensing system.
Figure 4B:
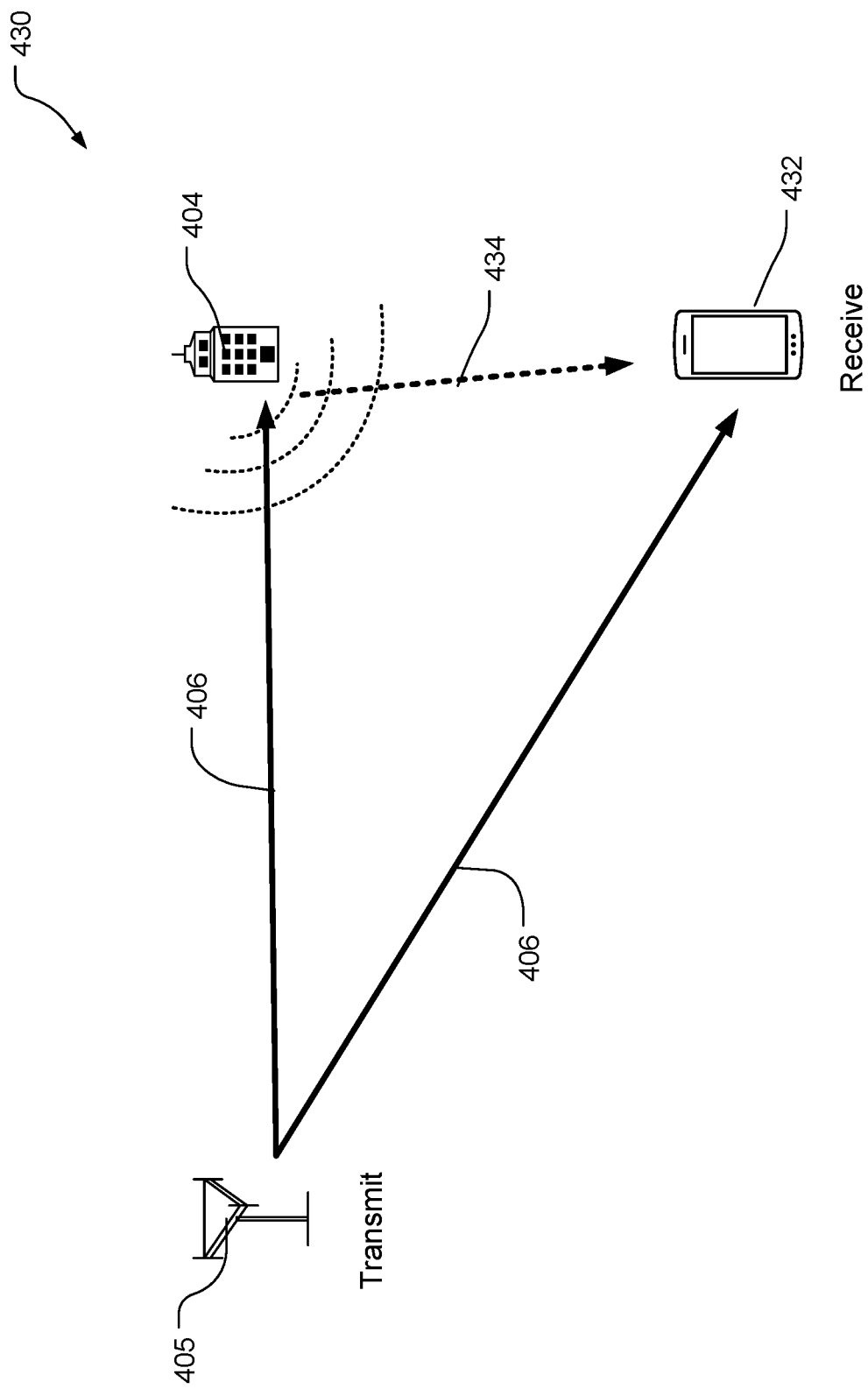
FIG. 4B illustrates an example bistatic RF sensing system.

In general, there are different types of RF sensing, and in particular, monostatic and bistatic (e.g., multistatic) RF sensing. FIGS. 4A and 4B illustrate two of these various types of RF sensing. Specifically, FIG. 4A is a diagram 400 illustrating a monostatic RF sensing scenario, and FIG. 4B is a diagram 430 illustrating a bistatic RF sensing scenario. The concepts of the bistatic RF sensing scenario in FIG. 4B may be extended to multiple stations for multistatic RF sensing. In FIG. 4A, a base station 402 may be configured for full duplex operation and thus the transmitter (Tx) and receiver (Rx) are co-located. For example, a transmitted radio frequency (RF) signal 406 may be reflected off of a target object, such as a building 404, and the receiver on the base station 402 is configured to receive and measure a reflected beam 408. This is a typical use case for traditional, or conventional, RF sensing. In an example, monostatic RF sensing may be realized with half duplex operation such that a transceiver may be configured to transmit a RF sensing signal at a first time, and then receive a reflected signal at a second time. In FIG. 4B, a base station 405 may be configured as a transmitter (Tx) and a UE 432 may be configured as a receiver (Rx). In this example, the transmitter and the receiver are not co-located, that is, they are separated. The base station 405 may be configured to transmit a beam, such as an omnidirectional downlink RF signal which may be received by the UE 432. A portion of the RF signal 406 may be reflected or refracted by the building 404 and the UE 432 may receive this reflected signal 434. This is the typical use case for wireless communication-based (e.g., WiFi-based, LTE-based, NR-based) RF sensing. Note that while FIG. 4B illustrates using a downlink RF signal 406 as a RF sensing signal, uplink RF signals can also be used as RF sensing signals. In a downlink scenario, as shown, the transmitter is the base station 405 and the receiver is the UE 432, whereas in an uplink scenario, the transmitter is a UE and the receiver is a base station.

Referring to FIG. 4B in greater detail, the base station 405 transmits RF sensing signals (e.g., OFDM reference signals or other waveforms) to the UE 432, but some of the RF sensing signals reflect off a target object such as the building 404. The UE 432 can measure the ToAs of the RF signal 406 received directly from the base station, and the ToAs of the reflected signal 434 which is reflected from the target object (e.g., the building 404).

The base station 405 may be configured to transmit the single RF signal 406 or multiple RF signals to a receiver (e.g., the UE 432). However, the UE 432 may receive multiple RF signals corresponding to each transmitted RF signal due to the propagation characteristics of RF signals through multipath channels. Each path may be associated with a cluster of one or more channel taps. Generally, the time at which the receiver detects the first cluster of channel taps is considered the ToA of the RF signal on the line-of-site (LOS) path (i.e., the shortest path between the transmitter and the receiver). Later clusters of channel taps are considered to have reflected off objects between the transmitter and the receiver and therefore to have followed non-LOS (NLOS) paths between the transmitter and the receiver.

Thus, referring back to FIG. 4B, the RF signal 406 follows a LOS path between the base station 405 and the UE 432, and the reflected signal 434 represents the RF sensing signals that followed a NLOS path between the base station 405 and the UE 432 due to reflecting off the building 404 (or another target object). The base station 405 may have transmitted multiple RF sensing signals (not shown in FIG. 4B), some of which followed the LOS path and others of which followed the NLOS path.

Alternatively, the base station 405 may have transmitted a single RF sensing signal in a broad enough beam that a portion of the RF sensing signal followed the LOS path and a portion of the RF sensing signal followed the NLOS path.

Based on the difference between the ToA of the LOS path, the ToA of the NLOS path, and the speed of light, the UE 432 can determine the distance to the building 404. In addition, if the UE 432 is capable of receive-beam forming, the UE 432 may be able to determine the general direction to the building 404 as the direction of the reflected signal 434, which is the RF sensing signal following the NLOS path as received. The UE 432 may then optionally report this information to the transmitting base station 405, an application server associated with the core network, an external client, a third-party application, or some other entity. Alternatively, the UE 432 may report the ToA measurements to the base station 405, or other entity, and the base station 405 may determine the distance and, optionally, the direction to the target object.

Note that if the RF sensing signals are uplink RF signals transmitted by the UE 432 to the base station 405, the base station 405 may be configured to perform object detection based on the uplink RF signals just like the UE 432 does based on the downlink RF signals.

Figure 5:
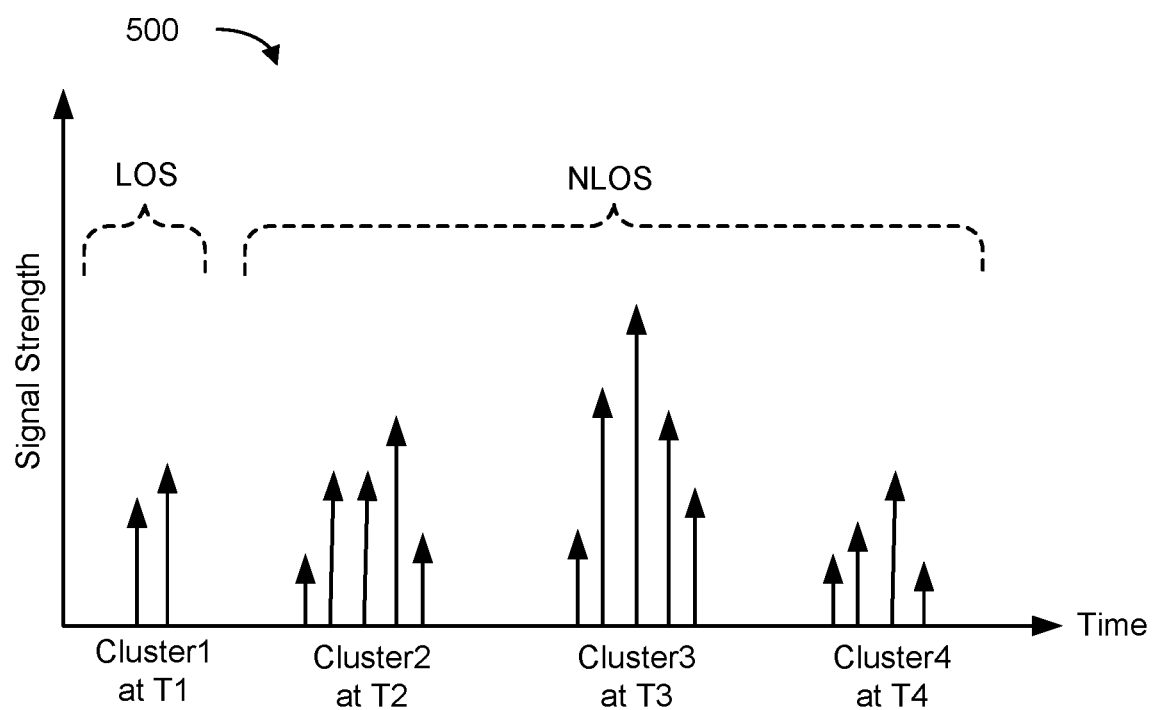
FIG. 5 is an example graph showing a radio frequency (RF) channel response over time.

Referring to FIG. 5, an example graph 500 showing an RF channel response at a receiver (e.g., any of the UEs or base stations described herein) over time is shown. In the example of FIG. 5, the receiver receives multiple (four) clusters of channel taps. Each channel tap represents a multipath that an RF signal followed between the transmitter (e.g., any of the UEs or base stations described herein) and the receiver. That is, a channel tap represents the arrival of an RF signal on a multipath. Each cluster of channel taps indicates that the corresponding multipaths followed essentially the same path. There may be different clusters due to the RF signal being transmitted on different transmit beams (and therefore at different angles), or because of the propagation characteristics of RF signals (potentially following widely different paths due to reflections), or both.

Under the channel illustrated in FIG. 5, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 5, because the first cluster of RF signals at time T1 arrives first, it is presumed to be the LOS data stream (i.e., the data stream arriving over the LOS or the shortest path), and may correspond to the LOS path illustrated in FIG. 4B (e.g., the RF signal 406). The third cluster at time T3 is comprised of the strongest RF signals, and may correspond to the NLOS path illustrated in FIG. 4B (e.g., the reflected signal 434). Note that although FIG. 5 illustrates clusters of two to five channel taps, as will be appreciated, the clusters may have more or fewer than the illustrated number of channel taps.

Figure 6:
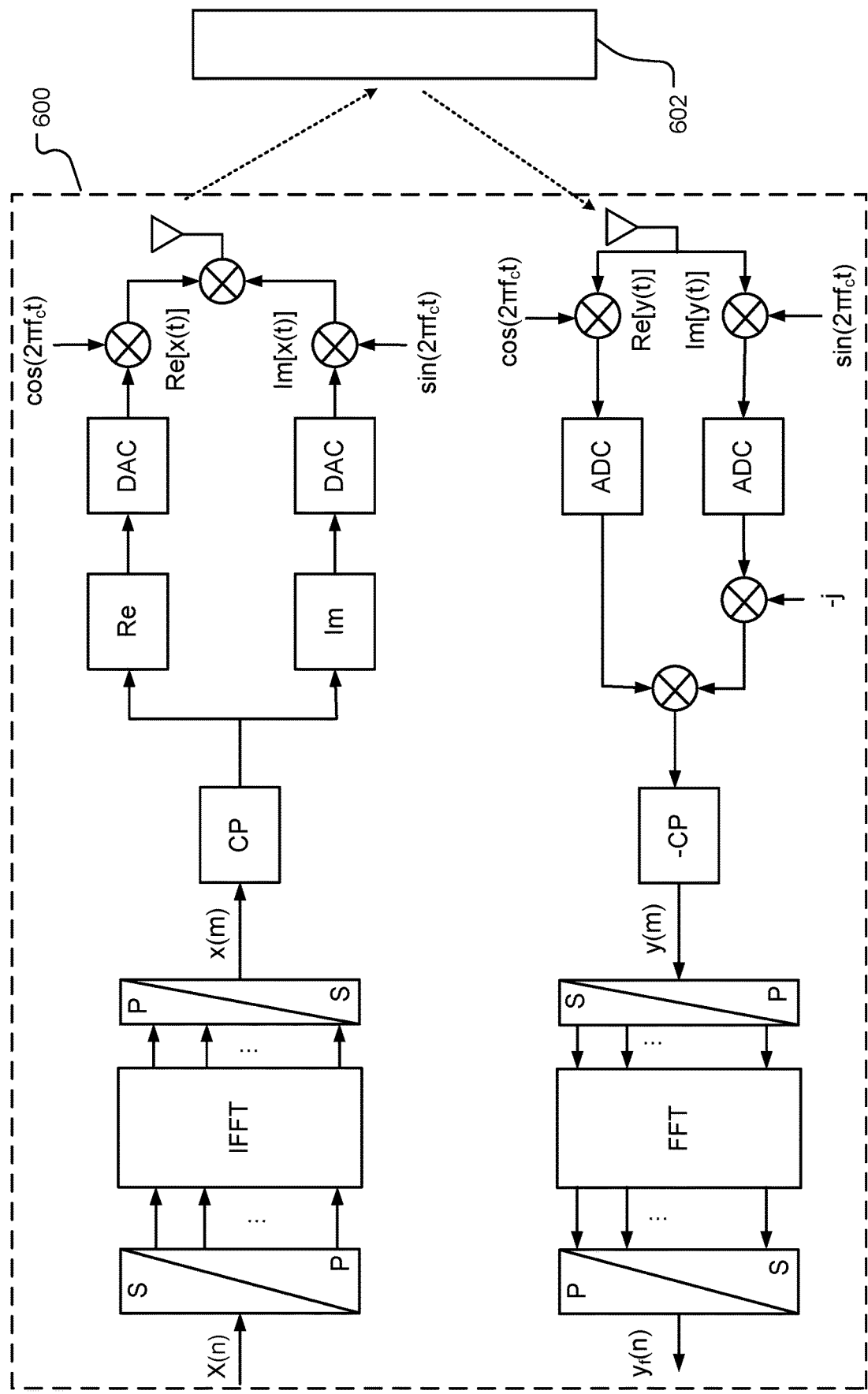
FIG. 6 is a block diagram of a prior art orthogonal frequency-division multiplexing (OFDM) system.

Referring to FIG. 6, a block diagram of a prior art OFDM system 600 is shown. The OFDM system 600 is an example of an ISAC capable OFDM transmitter and receiver that may be employed by the example wireless communication nodes described herein. The OFDM system 600 is configured to transmit OFDM signals which may be used for communications and RF sensing operations. OFDM symbols may be generated via Inverse Fast Fourier Transform (IFFT) and shifted into the RF band via quadrature modulation and transmitted over the channel, which may include one or more objects 602. A receiver may receive reflected signals and remove the cyclic prefix (CP) from the quadrature demodulated signal. Complex modulation symbols may be obtained via the FFT. The received waveform may be demodulated based on spectral division, which cancels out the transmitted complex modulation symbols by element-wise multiplication. This 2D-FFT processing enables distance-velocity RF sensing that is similar to frequency modulated continuous wave (FMCW) based radar systems.

Figure 7A:
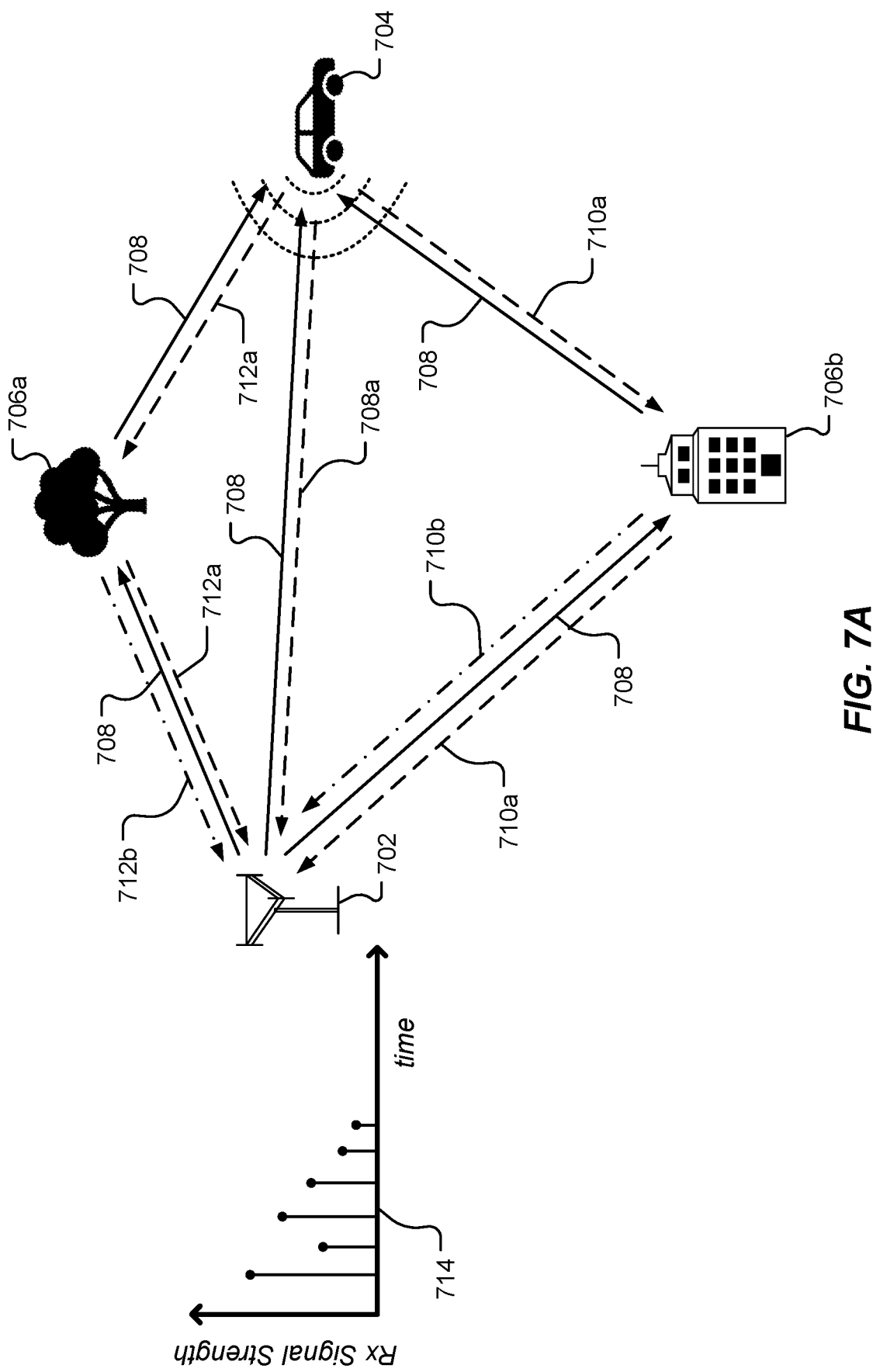
FIG. 7A is a diagram of example monostatic RF sensing operations with multipath signals.

Referring to FIG. 7A, a diagram of example monostatic RF sensing operations with multipath signals is shown. The diagram includes a base station 702 configured to transmit a first RF sensing signal 708 to detect a target object, such as a vehicle 704. The RF sensing signal 708 may follow multiple paths and multiple echo signals may be generated based on the multiple paths. The multiple paths may include reflecting part of the RF sensing signal 708 to the vehicle 704, and creating multiple echo signals for the target object and other objects. For example, a tree 706a and a building 706b may cause portions of the RF sensing signal 708 to reflect to the vehicle 704. The vehicle 704, the tree 706a, and the building 706b may also cause echo signals which may be received by the base station 702. For example, a LOS echo signal 708a may be reflected from the vehicle 704, as well as echoes generated from the multipath signals such as a first echo signal 710a and a second echo signal 712a. The echo signals 710a and 712a may also be reflected by the building 706b and the tree 706a and detected by the base station 702. The tree 706a and building 706b may each generate respective echo signals 712b, 710b which are received by the base station 702. A representation of the received RF sensing signal (i.e., based on the echo signals) is indicated in a first signal graph 714. The first signal graph 714 is an example of a first received RF sensing signal which may be received and time reversed to generate a time reversed RF sensing signal.

Figure 7B:
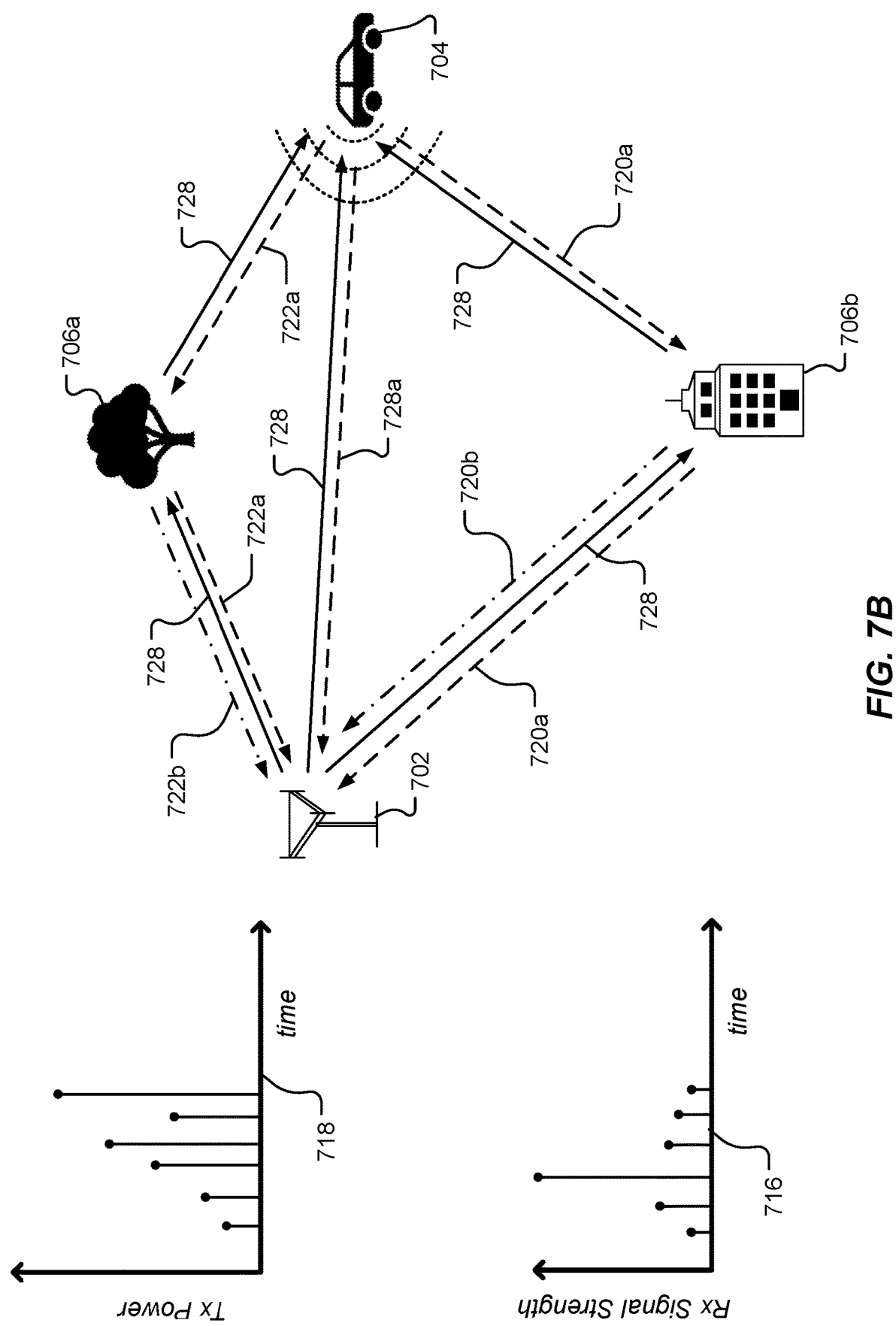
FIG. 7B is a diagram of the example monostatic RF sensing operations in FIG. 7A with a time reversed RF sensing signal.

Referring to FIG. 7B, with further reference to FIG. 7A, a diagram of example monostatic RF sensing operations with a time reversed signal is shown. A second signal graph 718 represents a time reversed signal based on the received RF sensing signal indicated in the first signal graph 714. The power levels of a transmitted RF sensing signal based on the second signal graph 718 may be normalized (e.g., each component may be increased by an amount). For example, the base station 702 may transmit a time reversed (TR) RF sensing signal 728 to improve the SNR for LOS path to the vehicle 704. The tree 706a, the building 706b, and the vehicle 704 may cause respective echo signals to be generated as described in FIG. 7A, but the TR RF sensing signal 728 may compress the multipath channel. For example, the echo signals 728a, 720a, 720b, 722a, 722b may be received by the base station 702. A third signal graph 716 represents the received RF sensing signal based on the TR RF sensing signal 728. As depicted in the third signal graph 716, the multipath signals are compressed relative to the LOS path and the SNR for the echo signals from the vehicle 704 is increased. The multipath channel in FIGS. 7A and 7B, and the corresponding signal graphs 714, 716, 718, are examples, and not limitations, to illustrate the compression of multipath signals based on TR RF sensing signals.

In an example, the time reversed signals described in FIGS. 7A and 7B may be realized with an implementation of a time reversal (TR) filter based on a known or estimated channel impulse response (CIR). In a TR transmission, a reference signal S may be pre-filtered with a time reversed filter:

$$S_t = S \circledast h(-t)^* \quad (1)$$

where the time reversal filter h(−t)* is the time reversed CIR between two wireless nodes, such as a UE and a gNB. In an example, the CIR may be determined based on an echo signal (e.g., in monostatic sensing). The filtered signal St may be transmitted by one of the wireless nodes.

A resulting TR signal 'Y' received by the other wireless node may be written as:

$$Y = S \circledast h(-t)^* \circledast h(t) \quad (2)$$

At the receiver side, the equivalent CIR is $R_{hh}$=h(−t)* ⊛ h(t), which is the channel autocorrelation.

Since TR filtering may compress the multipath channel, it may increase the SNR and improve the target detection performance. This technique to increase the SNR relies upon the knowledge of the channel, in particular, the CIR h(t) of the channel. Thus, in an aspect, TR precoding (TR filtering) of a reference signal (RS) at the transmitter may be based on a channel state information (CSI) between the transmitter and the receiver (e.g., CSI between a UE and a gNB) from which h(t) may be estimated. The TR precoding h(−t)* is in the time domain but may be equivalently represented as TR filters H(f) in the frequency domain. Generating a TR RF sensing signal may include multiplying a RF sensing signal by the frequency domain filters H(f) before being transmitted. Since a signal may be multiplied by a precoder before transmission, each H(f) may be viewed as a TR precoder derived based on the estimated channel states.

Figure 8A:
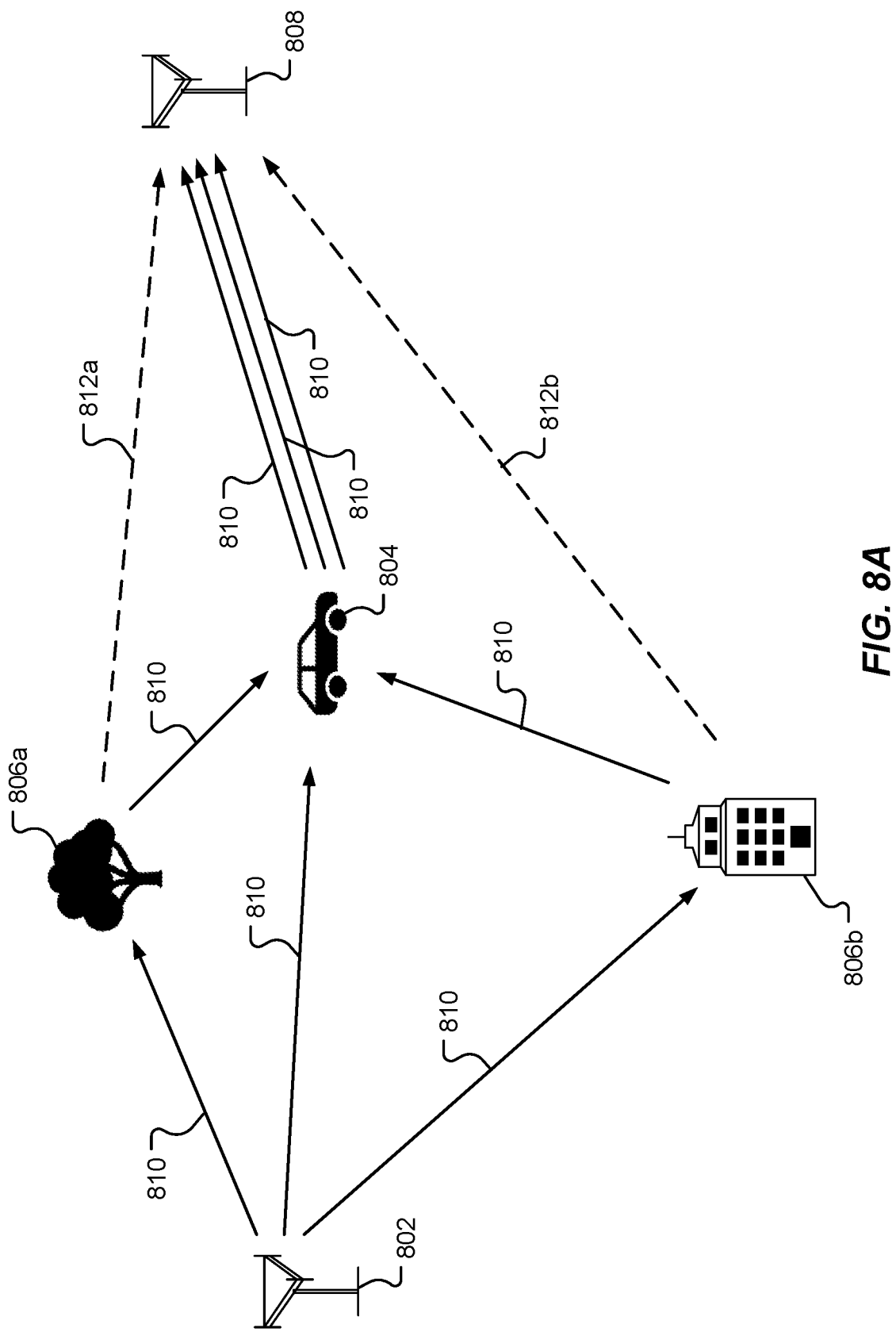
FIGS. 8A and 8B are conceptual diagrams of example bistatic RF sensing operations with a time reversed RF sensing signal.
Figure 8B:
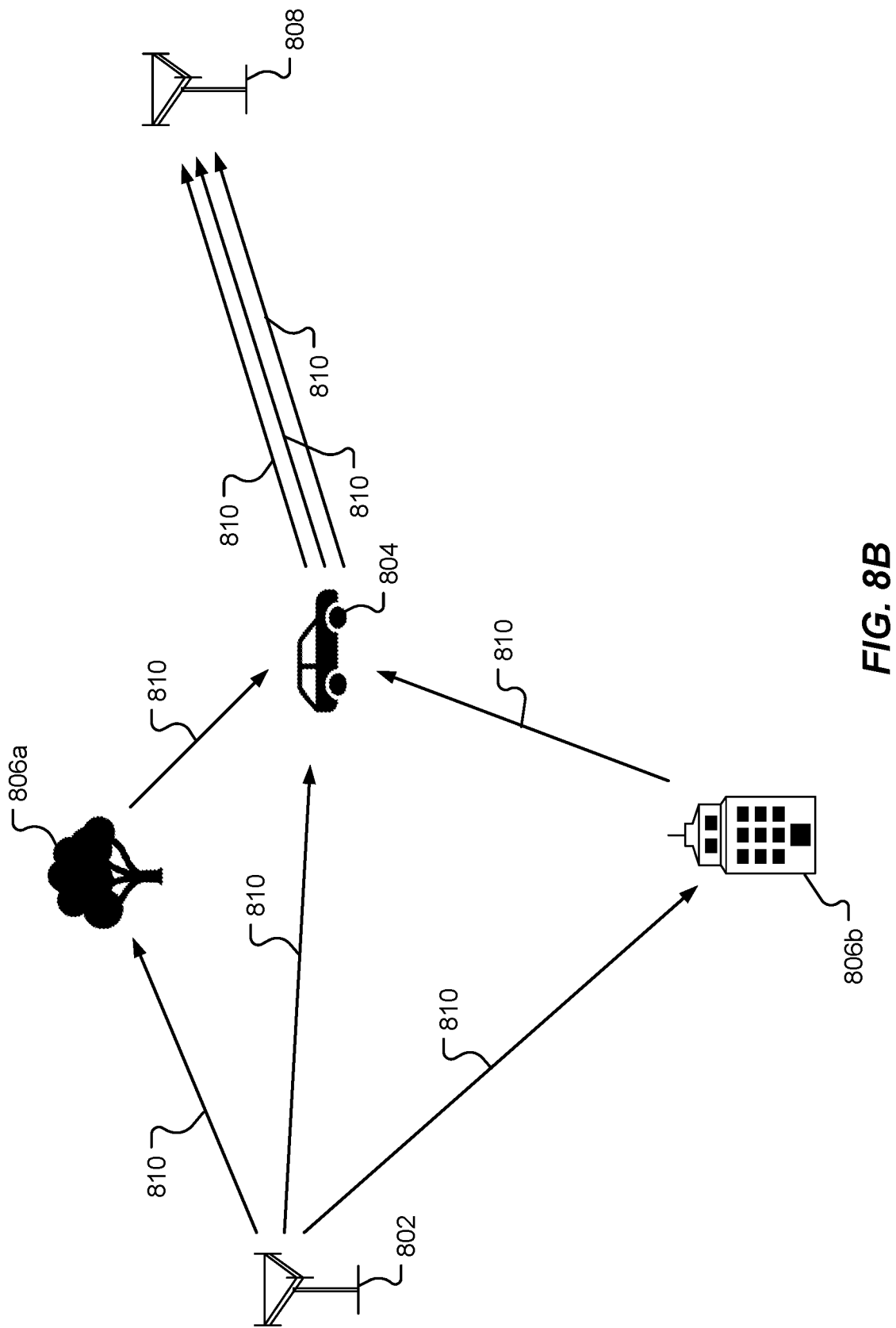

Referring to FIGS. 8A and 8B, conceptual diagrams of example bistatic RF sensing operations with a time reversed RF sensing signal are shown. A first wireless node, such as a first base station 802, may be configured to transmit a TR RF sensing signal 810. The TR RF sensing signal 810 may be based on a previously received RF sensing signal (i.e., as described in FIGS. 7A and 7B), or based on a TR filter (i.e., equation (1)). The TR RF sensing signal 810 may propagate over multiple paths and may be reflected by objects such as a vehicle 804, a tree 806a and a building 806b. A second wireless node, such as a second base station 808 (or UE or other mobile device), may be configured to receive the TR RF sensing signal 810 via the multiple paths. In operation, since the channel between the first and second base stations 802, 804 is known, the reflected paths between stationary objects such as the tree 806a and the building 806b are also known. In an example, the channel includes a first path 812a between the tree 806a and the second base station 808 and a second path 812b between the building 806b and the base station 808. The TR RF sensing signal is pre-coded based on the known channel (e.g., the CIR h(t) of the channel). As a result, referring to FIG. 8B, the received signal Y at the second base station is a compression of the multipath channel which increases the SNR of the RF sensing signal. For example, the signals received via the first and second path 812b may be reduced as compared to the signals received via the LOS path. The increase in SNR for a TR RF sensing signal may improve target detection performance for RF sensing operations. While FIGS. 8A and 8B depict two wireless nodes, additional wireless nodes may be configured to transmit and/or receive TR RF sensing signals for multistatic RF sensing operations.

Referring to FIG. 9A, an example process 900 for performing monostatic RF sensing operations with a time reversed RF sensing signal is shown. A wireless node, such as the UE 302 or the base station 304, may be configured to perform the process 900. At stage 902, referring to FIG. 7A, a wireless node such as the base station 702 may be configured to transmit a RF sensing signal 708. The RF sensing signal may be a an uplink or downlink reference signal (UL RS or DL RS) based on which wireless node is transmitting, and may utilize an OFDM waveform. Other reference signals may also be used. At stage 904, the base station 702 receives echo signals from the channel, such as the echo signals 708a, 710a-b, 712a-b as depicted in FIG. 7A. At stage 906, the base station 702 (e.g., the processing system 384 and the RF sensing component 388) is configured to reverse the captured echo sensing signals and then normalize the energy of the reversed signal at stage 908. For example, the received echo signals may be of low power and the base station 702 may be configured to amplify the reversed signal for transmission. At stage 910, the base station 702 transmits the time reversed RF sensing signal. For example, the base station may transmit the TR RF sensing signal 728. At stage 912, the base station 702 receives echo signals, such as the echo signals 728a, 720a, 720b, 722a, 722b which are generated from reflections (e.g., echoes) of the transmitted TR RF sensing signal 728.

Referring to FIG. 9B, an example process 920 for monostatic RF sensing with a time-reversal filter applied to a RF sensing signal is shown. At stage 922, a wireless node, such as the base station 702, is configured to transmit an RF signal (e.g., sensing signal, reference signal) and may estimate the sensing channel at stage 924. The channel estimate may be based on the CIR of the sensing channel. In an example, the sensing channel estimate may be received from a network entity (e.g., sensing server) or another wireless node. At stage 926, the base station 702 (e.g., the processing system 384 and the RF sensing component 388) is configured to apply TR precoding on the sensing signal. In an example, the precoding may be the time reversed CIR of the channel (i.e., as described in equation (1)). The resulting filtered signal St may be transmitted by the base station 702 at stage 928. At stage 930, the receiver in the base station 702 receives the TR precoded sensing signal. For example, the TR signal 'Y' described in equation (2). The RF sensing component 388 may be configured to perform object detection and tracking based on the echoes generated by the TR RF sensing signal. Other wireless nodes, such as the UE 302 may be configured to perform the monostatic RF sensing processes 900, 920.

In an example, the communications system 100 may be configured with requirements for RF sensing waveforms and sensing configurations. For example, the original sensing signal transmitted at stage 902 or stage 922 and the TR echo sensing signal transmitted at stage 910 or stage 928 may be configured to be transmitted with the same beam for channel reciprocity. A time gap between the original sensing signal and the TR echo sensing signal may be configured to be small (e.g., less than 200 ms) to ensure channel reciprocity/coherency. Other time gap values may also be used based on the channel environment. A sensing server may be configured to recommend a maximum time gap for the TR operations to show how frequently the environment changes. Referring to the process 900, a network entity (e.g., sensing server) may configure the time/frequency resources for TR echo sensing signal transmission. For example, the network entity may not be aware of what signal will be time reversed and re-transmitted to the environment, hence the network entity may just configure the time/frequency resource for the TR transmission. Resource allocations may include information on resources for transmitting the initial RF sensing signal, resources for transmitting the TR RF sensing signal, as well as time gap between the initial RF sensing signal transmission and TR RF sensing signal transmission. In an example, a wireless node in the communication system 100 may transmit capability messages to indicate a required time gap between the initial RF sensing signal transmission and TR RF sensing signal transmission. A reference signal may be configured for the initial RF sensing signal transmission, and only resources will be configured for TR RF sending signal transmission.

Referring to the process 920, a network entity may configure the sensing RS for the transmission of the TR precoded sensing signal. In an example, the sensing signals for sensing channel estimation may be different from the sensing RS for TR precoding and re-transmission. Resource allocation may include information on resources for the initial RF sensing signal transmission, resource for TR RF sensing signal transmission, as well as time gap between the initial RF sensing signal transmission and TR RF sensing transmission to allow time for the TR precoding (e.g., based on the processing capabilities of the wireless node). The time gap information may be included in capability reporting. In an example, two different reference signals may be quasi-colocated (QCLed) to maintain channel reciprocity.

Figure 10A:
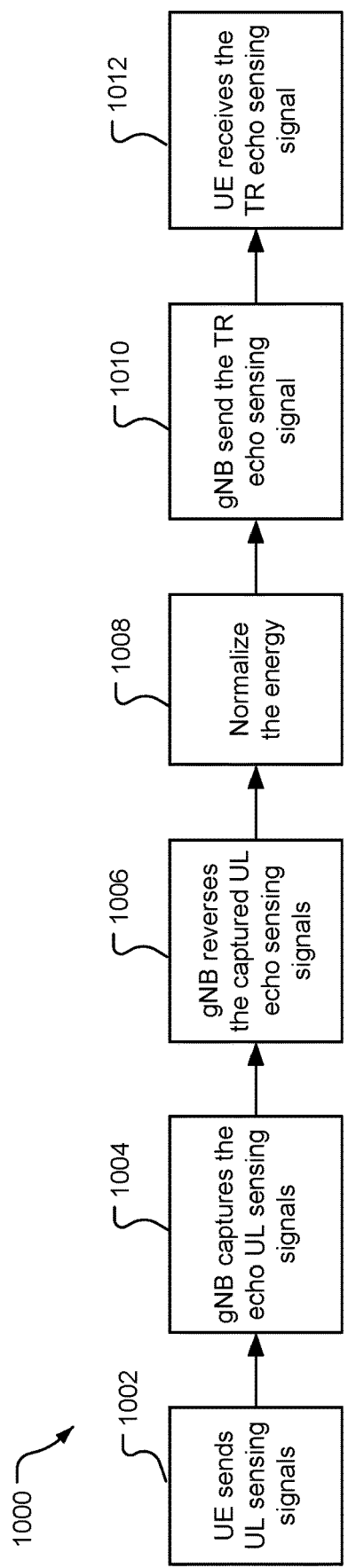
FIGS. 10A and 10B are example process flows for bistatic RF sensing with time reversed RF sensing signals.
Figure 10B:
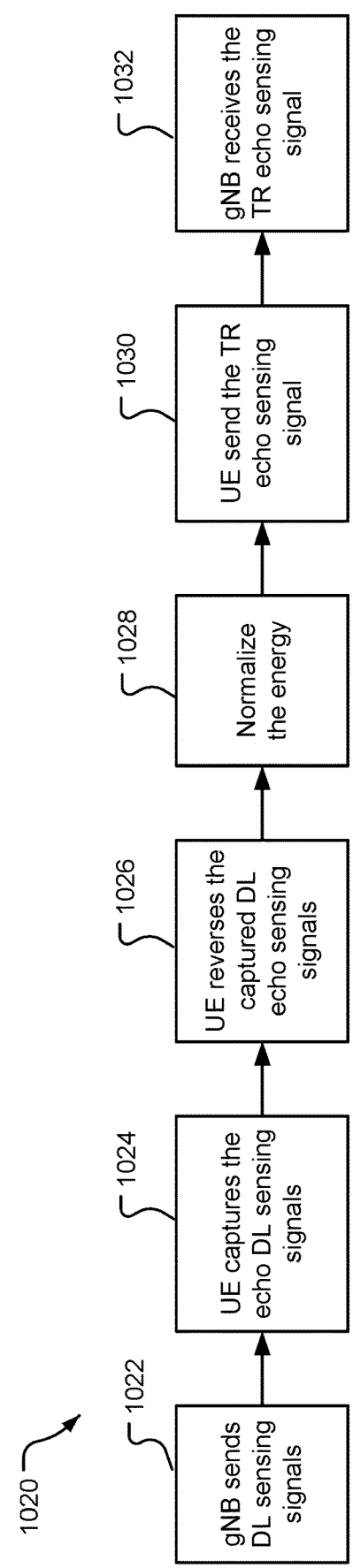

Referring to FIGS. 10A and 10B, example processes for bistatic RF sensing with time reversed RF sensing signals are shown. The processes may utilize both uplink (UL) and downlink (DL) channels. In a first process 1000, at stage 1002, a UE 302 is configured to send UL sensing signals and a base station 304, such as a gNB, is configure to receive echoes of the UL sensing signals at stage 1004. The gNB is configured to reverse the captured UL echo sensing signal as described in FIG. 7B at stage 1006 and at stage 1008, the gNB is configured to normalize the energy of the received UL echo sensing signal. At stage 1010, the gNB is configured to send a TR RF sensing signal (e.g., echo sensing signal) and the UE 1012 is configured to receive echoes from the TR RF sensing signal. In a second process 1020, at stage 1022, a base station 304 (e.g., gNB) is configured to send DL sensing signals and a UE 302 is configure to receive the DL sensing signals at stage 1024. The UE 302 is configured to reverse the captured DL echo sensing signal as described in FIG. 7B at stage 1026 and at stage 1028, the UE 302 is configured to normalize the energy of the received DL echo sensing signal. At stage 1030, the UE 302 is configured to send a TR RF sensing signal (e.g., echo sensing signal) and the gNB 1032 is configured to receive echoes from the TR RF sensing signal.

In an example, TR based multistatic sensing may also be supported. If there are multiple gNBs or multiple UEs configured to transmit the TR sensing signals, the transmitted TR signal from each gNB or UE may be different, as the channels are different.

Referring to FIGS. 11A and 11B, example process flows for bistatic RF sensing with time reversed RF signals based on explicit channel estimation are shown. The processes may utilize both UL and DL channels. In a first process 1100, at stage 1102, a UE 302 is configured to send UL sensing signals and a base station 304 (e.g., gNB) is configured to estimate the UL sensing channel at stage 1104. For example, the gNB may be configured to determine the CIR for the sensing channel. At stage 1106, the gNB is configured to apply TR precoding to a DL RF sensing signal. The TR precoding may be, for example, the time reversal filter h(−t)* described in equation (1) (e.g., the time reversed CIR between the UE and the gNB). At stage 1108, the gNB is configured to transmit the TR precoded DL RF sensing signal (e.g., the filtered signal St). At stage 1110, the UE 302 is configured to receive TR precoded DL RF sensing signal (e.g., the TR signal 'Y' of equation (2)). In a second process 1120, at stage 1122, a base station 304 (e.g., gNB) is configured to send DL sensing signals and UE 302 is configured to estimate the UL sensing channel at stage 1124. For example, the UE 302 may be configured to determine the CIR for the sensing channel. At stage 1126, the UE 302 is configured to apply TR precoding to a UL RF sensing signal. The TR precoding may be, for example, the time reversal filter h(−t)* described in equation (1) (e.g., the time reversed CIR between the gNB and the UE). At stage 1128, the UE 302 is configured to transmit the TR precoded UL RF sensing signal (e.g., the filtered signal St). At stage 1130, the gNB is configured to receive TR precoded UL RF sensing signal (e.g., the TR signal 'Y' of equation (2)).

Figures 12A, 12B:
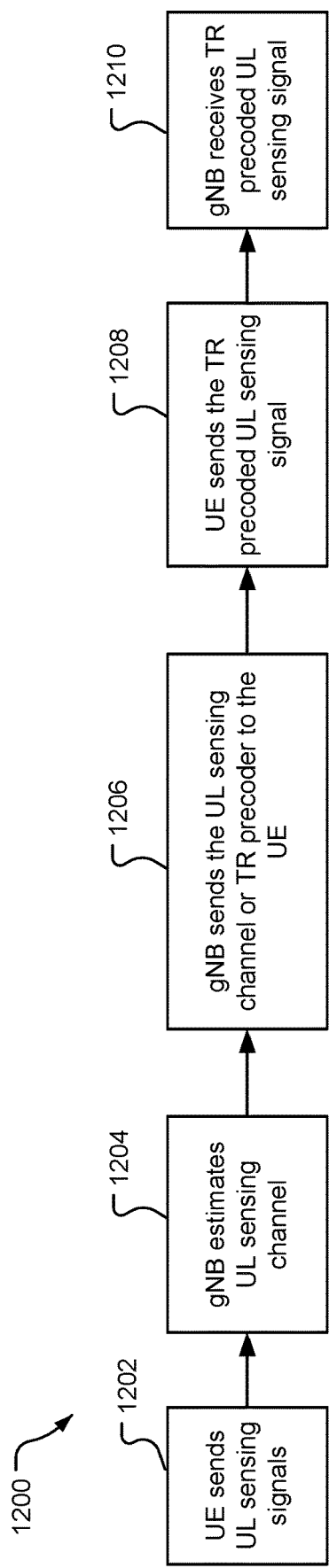
FIGS. 12A and 12B are example process flows for bistatic RF sensing with time reversed RF signals based on channel state information (CSI) feedback.

Referring to FIGS. 12A and 12B, example processes for bistatic RF sensing with time reversed RF signals based on channel state information (CSI) feedback. The processes may utilize both UL and DL channels. In a first process 1200, at stage 1202, a UE 302 is configured to send UL sensing signals and a base station 304 (e.g., gNB) is configured to estimate the UL sensing channel at stage 1204. For example, the gNB may be configured to determine the CIR for the sensing channel. At stage 1206, the gNB is configured to send the UL sensing channel or TR precoder to the UE 302. The UL sensing channel may be the CIR (e.g., the gNB provides h(t)). The UL sensing channel or TR precoder may be signaled in the time domain or through a frequency domain expression of the channel. In an example, down sampling techniques may be used to reduce signaling overhead. In an example, the gNB may be configured to send the autocorrelation function. The TR precoder may be, for example, the time reversal filter h(−t)*. At stage 1208, the UE 302 is configured to transmit the TR precoded UL RF sensing signal (e.g., the filtered signal St) based on the received UL sensing channel or TR precoder received from the gNB. At stage 1210, the gNB is configured to receive a TR precoded UL RF sensing signal. In a second process 1220, at stage 1222, a base station 304 (e.g., gNB) is configured to send DL sensing signals and a UE 302 is configured to estimate the DL sensing channel at stage 1224. For example, the UE 302 may be configured to determine the CIR for the DL sensing channel. At stage 1226, the UE 302 is configured to send the DL sensing channel or TR precoder to the gNB. The DL sensing channel may be the CIR (e.g., the UE provides h(t)). The DL sensing channel or TR precoder may be signaled in the time domain or through a frequency domain expression of the channel. In an example, down sampling techniques may be used to reduce signaling overhead. The UE 302 may be configured to send the autocorrelation function. The TR precoder may be, for example, the time reversal filter h(−t)*. At stage 1228, the gNB is configured to transmit the TR precoded DL RF sensing signal (e.g., the filtered signal St) based on the received DL sensing channel or TR precoder received from the UE 302. At stage 1230, the UE is configured to receive a TR precoded DL RF sensing signal.

In operation, the TR precoder may be either base station specific or UE specific. If the same RF sensing signal is measured by multiple base stations or UEs, additional stages may be implemented. For example, a UL sensing reference signal may be associated with multiple DL sensing reference signals (or other DL RS). Each DL sensing signal (or other DL RS) may be associated with different base stations (e.g., TRPs). Based on multiple DL RS measurements, different TR precoders may be derived. In an example, the DL sensing reference signals may be associated with multiple UL sensing reference signals (or other UL RS). Each UL sensing signal (or other UL RS) may be associated with different UEs. Based on multiple UL RS measurements, different TR precoders may be derived.

In an embodiment, a beat signal may be utilized with TR based sensing. In operation, wideband TR based sensing may be difficult to implement due to the high-rate analog to digital conversion (ADC) and/or digital to analog conversion (DAC), and associated memory and/or computation requirements. Both direct time reversal or precoding-based time reversal may be high complexity implementations if the sensing signal bandwidth is high. In an example, a FMCW type waveform may be used and the corresponding stretch processing (e.g., mixer-based operations) may reduce the TR processing complexity. Stretch processing may also be referred to as deramp and may include mixing a received echo signal with a replica of a transmitted FMCW pulse. The mixed signal may contain a frequency component corresponding to a range offset. The range to an object may be estimated based on a spectral analysis of the signal at the output of the mixer. ADC requirements may be reduced in stretch processing-based channel estimations for TR precoder derivation. In an example, instead of transmitting the TR echo sensing signal or TR precoded sensing signal, a gNB or UE may be configured to directly transmit a time reversed beat signal to the environment. The time reversal of the beat signal may be treated as phase conjugation in the spatial frequency domain, which may enable a low complexity implementation of time reversal.

Figure 13:
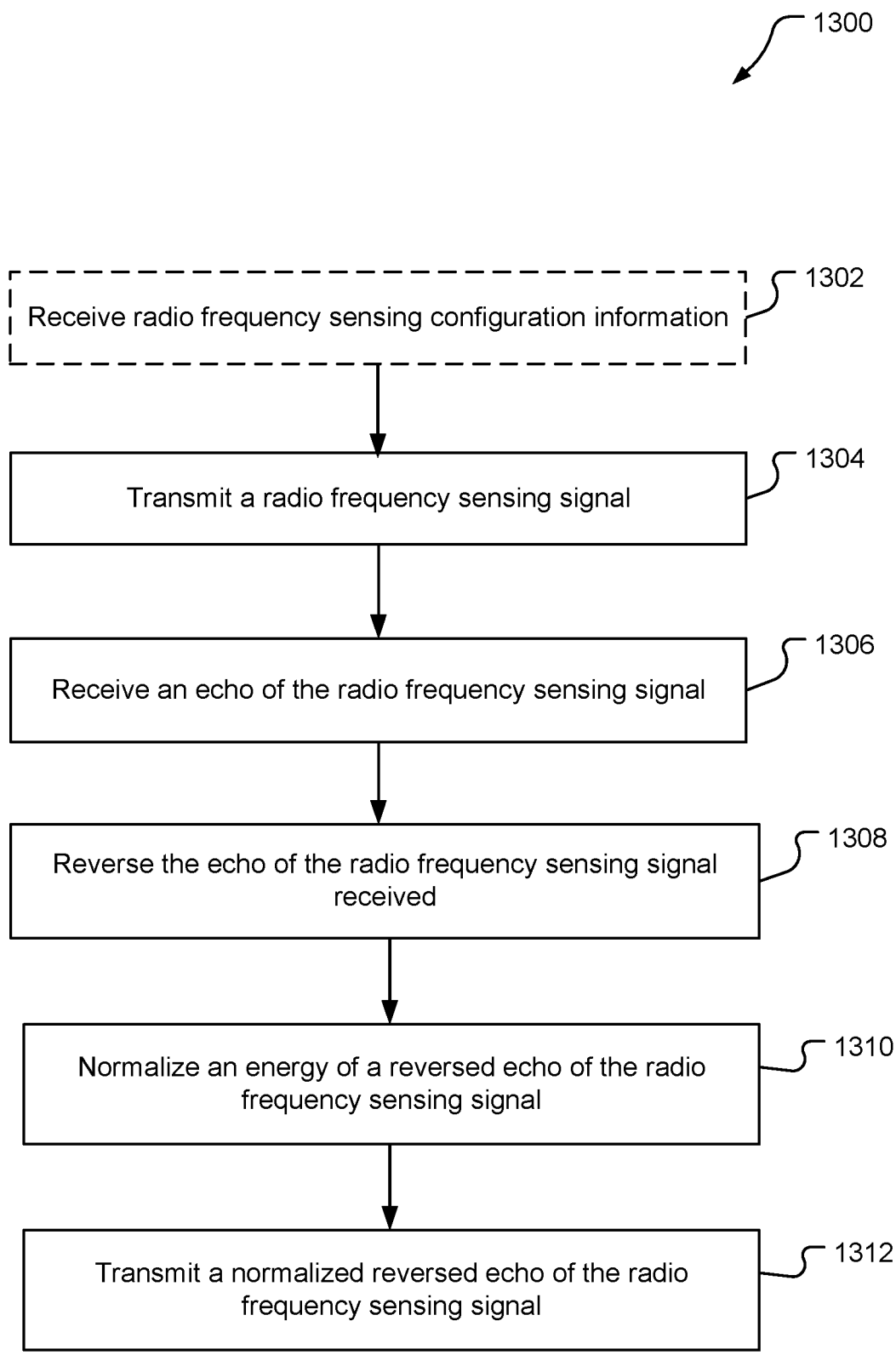
FIG. 13 is an example process flow diagram of a method for transmitting a time reversed RF sensing signal for monostatic RF sensing operations.

Referring to FIG. 13, with further reference to FIGS. 1-12B, a method 1300 for transmitting a time reversed RF sensing signal for monostatic radio frequency sensing operations includes the stages shown. A UE 302 or a base station 304, or other wireless nodes described herein, may be configured to transmit time reversed RF sensing signals. The method 1300 is, however, an example and not limiting. The method 1300 may be altered, e.g., by having stages added, removed, rearranged, combined, performed concurrently, and/or having single stages split into multiple stages. For example, receiving RF sensing configuration information at stage 1302 is optional.

At stage 1302, the method optionally includes receiving radio frequency sensing configuration information. The base station 304, including the processing system 384 and the transceiver 350 is a means for receiving RF sensing configuration information. Other wireless nodes, such as the UE 302 may also be a means for receiving RF sensing configuration information. In an example, a network entity such as the LMF 270, a sensing server, or a gNB, may be configured to provide RF sensing resource information to enable a wireless node to perform RF sensing operations in the context of the communication system 100. The RF sensing configuration information may include transmit resource configuration information (e.g., time and/or frequency resources) for initial RF sensing signal transmissions. The RF sensing configuration information may include time gap information associated with the time between transmission of RF sensing signals and a corresponding TR RF sensing signal. In an example, the RF sensing configuration information may be provided in response to an on-demand request and/or capability information received from a wireless node.

At stage 1304, the method includes transmitting a radio frequency sensing signal. The base station 304, including the processing system 384 and the transceiver 350 is a means for transmitting a RF sensing signal. Other wireless nodes, such as the UE 302 may also be a means for transmitting a RF sensing signal. Referring to FIG. 7A, A base station 702 may be configured to transmit a RF sensing signal into an environment. The RF sensing signal may be an OFDM reference signal or other sensing waveform, such as a FMCW waveform. For example, the RF sensing signal may be the RF sensing signal 708. Other reference signals may be utilized as the RF sensing signal.

At stage 1306, the method includes receiving an echo of the radio frequency sensing signal. The base station 304, including the processing system 384 and the transceiver 350 is a means for receiving the echo signal. Other wireless nodes, such as the UE 302 may also be a means for receiving echo signals. Referring to FIG. 7A, the echo may include reflections from target objects and other objects in the channel. The echo signals may include echo signals from the channel, such as the echo signals 708*a*, 710*a-b*, 712*a-b*.

At stage 1308, the method includes reversing the echo of the radio frequency sensing signal received. The base station 304, including the processing system 384 is a means for reversing the echo signal. Other wireless nodes, such as the UE 302 may also be a means for reversing echo signals. The time reversed echo signal may be an explicit reversal of a received waveform in the time domain as illustrated in FIG. 7B. The waveform may be referred to as the CIR signal.

At stage 1310, the method includes normalizing an energy of a reversed echo of the radio frequency sensing signal. The base station 304, including the processing system 384 and the transceiver 350 is a means for normalizing the reversed echo signal. Other wireless nodes, such as the UE 302 may also be a means for normalizing a time reversed signal. The normalization may include increasing the power of the reversed signal for transmission. In an example, an amplification factor may be applied to the received echo signal to boost the energy for transmission.

At stage 1312, the method includes transmitting a normalized reversed echo of the radio frequency sensing signal. The base station 304, including the processing system 384 and the transceiver 350 is a means for transmitting the normalized reversed echo of the RF sensing signal. Other wireless nodes, such as the UE 302 may also be a means for transmitting the normalized TR RF sensing signal. In an example, referring to FIG. 7B, the normalized reversed echo of the RF sensing signal is the TR RF sensing signal 728.

Figure 14:
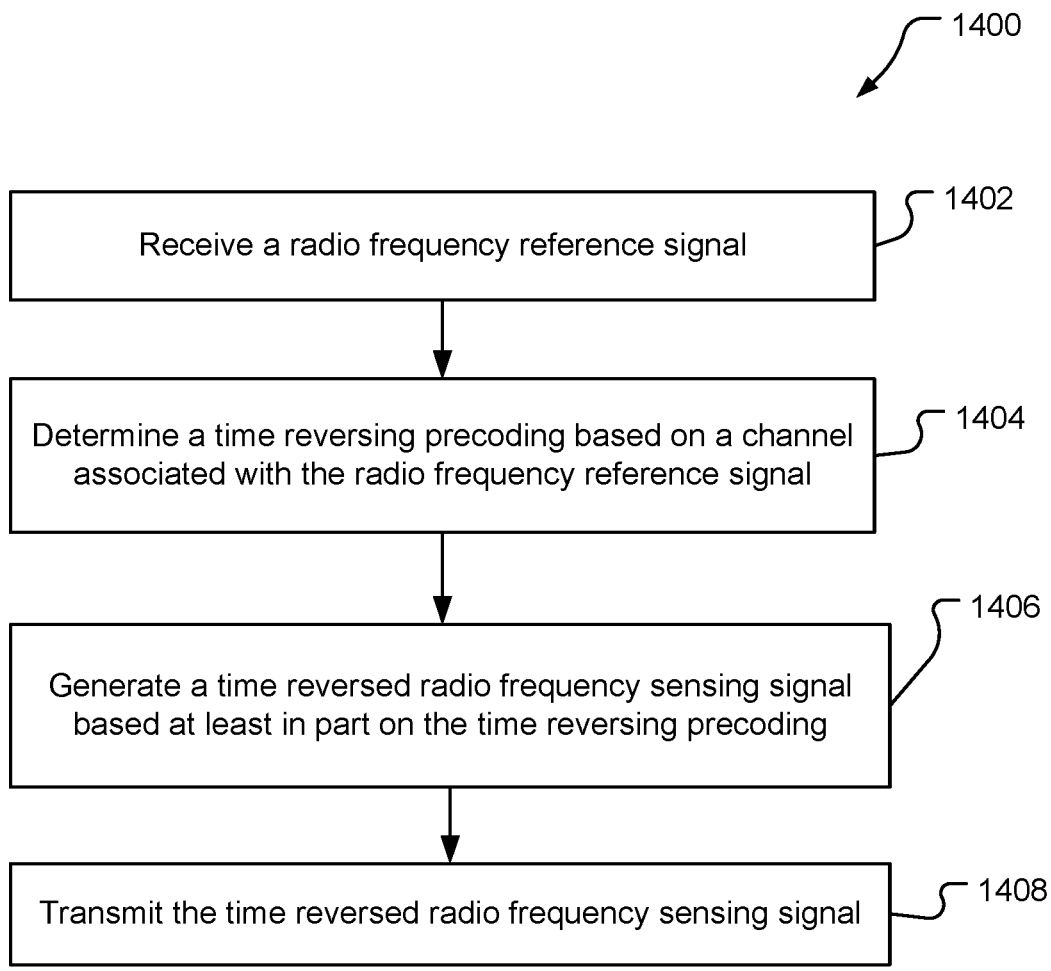
FIG. 14 is an example process flow diagram of a method for transmitting a RF sensing signal based on a time reversal precoding.

Referring to FIG. 14, with further reference to FIGS. 1-12B, a method 1400 for transmitting a RF sensing signal based on a time reversal precoding includes the stages shown. A UE 302 or a base station 304, or other wireless nodes described herein, may be configured to transmit time reversed RF sensing signals with a precoding. The method 1400 is, however, an example and not limiting. The method 1400 may be altered, e.g., by having stages added, removed, rearranged, combined, performed concurrently, and/or having single stages split into multiple stages.

At stage 1402, the method includes receiving a radio frequency reference signal. A base station 304, including the processing system 384 and the transceiver 350 is a means for receiving a RF reference signal. Other wireless nodes, such as the UE 302 may also be a means for receiving a RF reference signals. In an example, the RF reference signals may include uplink reference signals (UL RS), or downlink reference signals (DL RS) based on the wireless node transmitting the reference signal. Examples of UL RS may include sounding reference signal (SRS), demodulation reference signal (DMRS), phase tracking reference signal (PTRS), etc. Examples of DL RS may include positioning reference signal (PRS), channel state information reference signal (CSI-RS), DMRS, primary synchronization signal (PSS), secondary synchronization signal (SSS), PTRS, etc. For signals such as DMRS and PTRS that may be transmitted in both UL (e.g., by the UE) and DL (e.g., by the gNB) directions, the signals may be prepended with UL or DL to distinguish. For example UL DMRS may be differentiated from DL DMRS. A wireless node may be configured to estimate a channel for the received RF reference signal. In an example, the channel estimate may be the channel impulse response (CIR). Other channel state information may also be used to estimate the channel.

At stage 1404, the method includes determining a time reversing precoding based on a channel associated with the radio frequency reference signal. The base station 304, including the processing system 384 and the transceiver 350 is a means for determining a TR precoding. Other wireless nodes, such as the UE 302 may also be a means for determining a TR precoding. In an example, referring to equation (1), the TR precoding is a time reversed CIR of the RF reference signal received at stage 1402 (e.g., h(−t)* of the RF reference signal). Other channel state information (e.g., received from network entities) may also be used to determine the TR precoding. The TR precoding h(−t)* is in the time domain but may be equivalently represented as TR filters H(f) in the frequency domain. Generating a TR RF sensing signal may include multiplying a RF sensing signal by the frequency domain filters H(f) before being transmitted. Since a signal may be multiplied by a precoder before transmission, each H(f) may be viewed as a TR precoder derived based on the estimated channel states (e.g., estimated based on the radio frequency signal received at stage 1402). In an example, referring to stage 1206 in FIG. 12A and stage 1226 in FIG. 12B, a wireless node may be configured to provide channel information or the TR precoding to other wireless nodes. In an multistatic use case, with RF reference signals being transmitted between various combinations of wireless nodes, a TR precoding may be associated with each of the combinations of wireless nodes. In a monostatic use case, the TR precoding may be based on the echo returned from transmitting a RF reference signal into the channel.

At stage 1406, the method includes generating a time reversed radio frequency sensing signal based at least in part on the time reversing precoding. The base station 304, including the processing system 384 and the transceiver 350 is a means for generating the TR RF sensing signal. Other wireless nodes, such as the UE 302 may also be a means for generating the TR RF sensing signal. In an example, referring to equation (1), the TR RF sensing signal is the filtered signal St transmitted by a wireless node.

At stage 1408, the method includes transmitting the time reversed radio frequency sensing signal. The base station 304, including the processing system 384 and the transceiver 350 is a means for transmitting the TR RF sensing signal. Other wireless nodes, such as the UE 302 may also be a means for transmitting the TR RF sensing signal. A wireless node is configured to transmit a RF sensing signal after applying the precoders at stage 1406. The wireless node (e.g., in a monostatic use case), or another wireless node (e.g., in a multistatic use case) is configured to receive the TR RF sensing signal 'Y' as described in equation (2).

Figure 15:
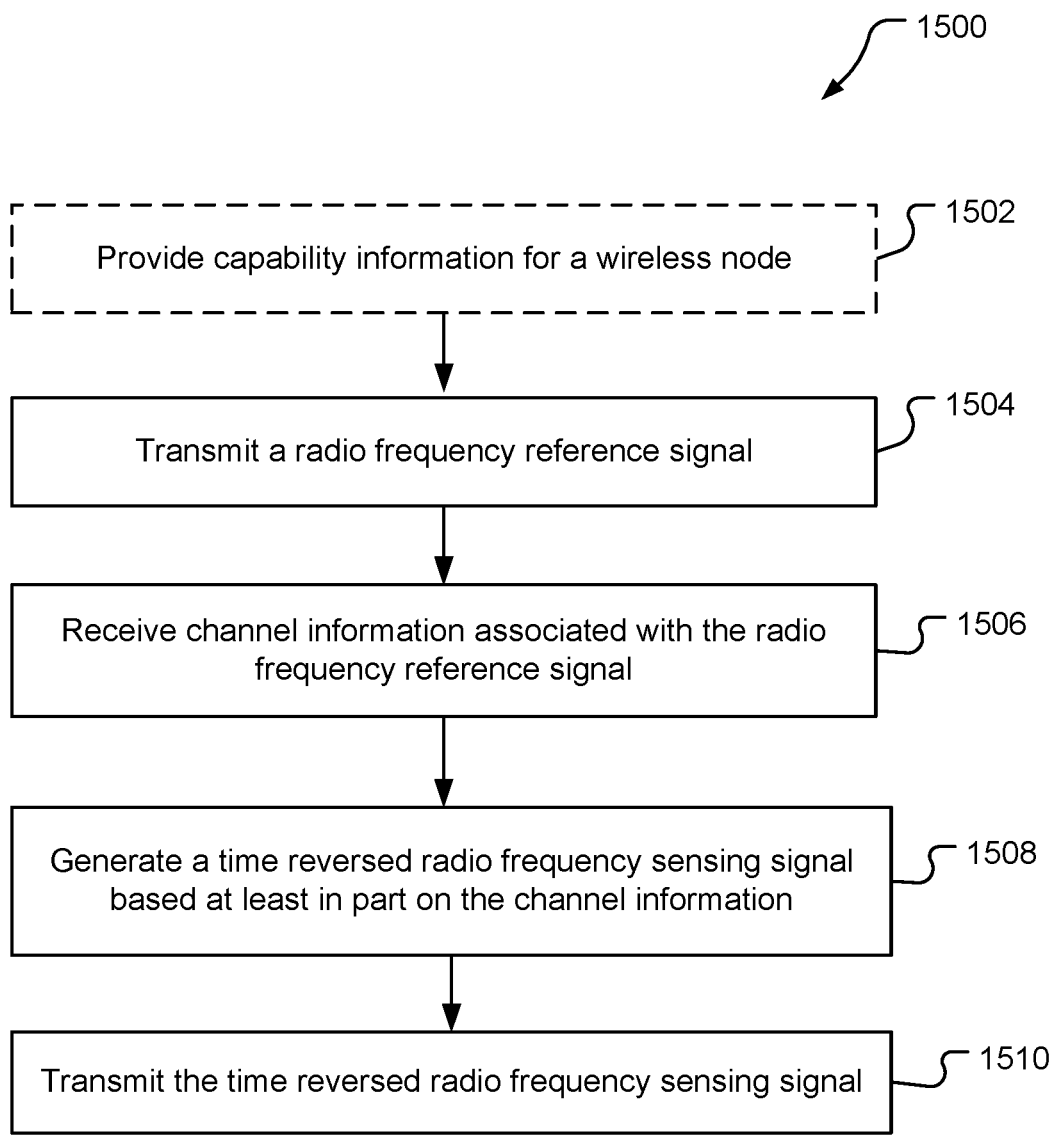
FIG. 15 is an example process flow diagram of a method for performing RF sensing operations.

Referring to FIG. 15, with further reference to FIGS. 1-12B, a method 1500 for performing RF sensing operations includes the stages shown. A UE 302 or a base station 304, or other wireless nodes described herein, may be configured to transmit time reversed RF sensing signals. The method 1500 is, however, an example and not limiting. The method 1500 may be altered, e.g., by having stages added, removed, rearranged, combined, performed concurrently, and/or having single stages split into multiple stages. For example, providing capability information at stage 1502 is optional.

At stage 1502, the method optionally includes providing capability information for a wireless node. A base station 304, including the processing system 384 and the transceiver 350 is a means for providing capability information. Wireless nodes, such as the UE 302 may also be a means for providing the capability information. In an example, a wireless node such as a UE may be configured to provide configuration information associated with the ability of the UE to process and implement TR RF sensing signals. The capabilities may be associated with frequency bandwidth and tuning abilities which may impact the timing gaps required to transmit, receive and/or process the TR RF sensing signals. Other capabilities may be associated with resource allocation and RF sensing signal resource scheduling. In an example, the capability information may include an on-demand request from a wireless node to request resources for RF sensing sessions. The capability information may be provided by a wireless node, or another network entity such as a sensing server configured to implement RF sensing operations in a network.

At stage 1504, the method includes transmitting a radio frequency reference signal. The base station 304, including the processing system 384 and the transceiver 350 is a means for transmitting a RF reference signal. Other wireless nodes, such as the UE 302 may also be a means for transmitting a RF reference signals. In an example, the RF reference signals may include UL RS or DL RS. UL RS may include SRS, DMRS, PTRS, etc. DL RS may include PRS, CSI-RS, DMRS, PSS, SSS, PTRS, etc. For signals such as DMRS and PTRS that may be transmitted in both UL (e.g., by the UE) and DL (e.g., by the gNB) directions, the signals may be prepended with UL or DL to distinguish. For example UL DMRS may be differentiated from DL DMRS. A wireless node may be configured to estimate a channel for the received RF reference signal. In an example, the channel estimate may be the channel impulse response (CIR). Other channel state information may also be used to estimate the channel.

At stage 1506, the method includes receiving channel information associated with the radio frequency reference signal. The base station 304, including the processing system 384 and the transceiver 350 is a means for receiving channel information. Other wireless nodes, such as the UE 302 may also be a means for receiving channel information. In an example, referring to stage 1206 in FIG. 12A or stage 1226 in FIG. 12B, a wireless node such as a gNB or UE, may be configured to provide channel information to other wireless nodes. A wireless node may be configured to send sensing channel or TR precoder information to other wireless nodes. The channel information may be the CIR (e.g., h(t)). The channel information may be signaled in the time domain or through a frequency domain expression of the channel. In an example, down sampling techniques may be used to reduce signaling overhead. The-41-information may be configured to send the autocorrelation function. The channel information may be, for example, the time reversal filter h(−t)*. The channel information may be provided as a time domain function, or may be represented as filters H(f) in the frequency domain. The channel information may be based on other channel state techniques, such as CSI information, precoder matrix indicators (PMI), and channel quality indicators (CQI) (e.g., for legacy devices). In an example, the channel information may include RF sensing resource information based at least in part on the capability information provided at stage 1502. For example, a gNB (or other network entity) may be configured to provide scheduling and resource information to a UE to enable the UE to perform TR RF sensing based on the capabilities of the UE.

At stage 1508, the method includes generating a time reversed radio frequency sensing signal based at least in part on the channel information. The base station 304, including the processing system 384 and the transceiver 350 is a means for generating the TR RF sensing signal. Other wireless nodes, such as the UE 302 may also be a means for generating the TR RF sensing signal. In an example, referring to equation (1), the TR RF sensing signal is generated based on the filtered signal St obtained by applying the channel information received at stage 1506. For example, the channel information may be the CIR, which may be time reversed and applied to a RF sensing signal. In an example, the channel information may be the time reversed CIR. In an example, the channel information may include frequency domain filters H(f), and generating a TR RF sensing signal may include multiplying a RF sensing signal by the frequency domain filters H(f) before being transmitted. Since a signal may be multiplied by a precoder before transmission, each H(f) may be viewed as a TR precoder derived based on the channel information.

At stage 1510, the method includes transmitting the time reversed radio frequency sensing signal. The base station 304, including the processing system 384 and the transceiver 350 is a means for transmitting the TR RF sensing signal. Other wireless nodes, such as the UE 302 may also be a means for transmitting the TR RF sensing signal. A wireless node is configured to transmit a RF sensing signal after applying the channel information at stage 1508. The wireless node (e.g., in a monostatic use case), or another wireless node (e.g., in a multistatic use case) is configured to receive the TR RF sensing signal 'Y' as described in equation (2) and perform object detection and/or tracking based on the TR RF sensing signal Y.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order.

Furthermore, although elements of the disclosure may be described or claimed in the singular, the plural is contemplated unless limitation to the singular is explicitly stated.

Implementation examples are described in the following numbered clauses:

Clause 1. A method for transmitting a time reversed radio frequency sensing signal for monostatic radio frequency sensing operations, comprising: transmitting a radio frequency sensing signal; receiving an echo of the radio frequency sensing signal; reversing the echo of the radio frequency sensing signal received; normalizing an energy of a reversed echo of the radio frequency sensing signal; and transmitting a normalized reversed echo of the radio frequency sensing signal.

Clause 2. The method of clause 1, wherein the radio frequency sensing signal is a frequency modulated continuous wave signal and the reversing the echo of the radio frequency sensing signal received includes stretch processing the echo by combining the echo with a replica of the radio frequency sensing signal.

Clause 3. The method of clause 2, wherein the reversing the echo of the radio frequency sensing signal further includes generating a time reversed beat signal corresponding to a phase conjugation in a spatial frequency domain for the radio frequency sensing signal.

Clause 4. The method of clause 1, wherein the reversing the echo of the radio frequency sensing signal received includes reversing a received waveform in a time domain.

Clause 5. The method of clause 1, wherein normalizing the energy of the echo of the radio frequency sensing signal received includes performing a power amplification of the echo of the radio frequency sensing signal.

Clause 6. The method of clause 1, further comprising receiving radio frequency configuration information from a network entity, wherein the network entity includes one of a mobile device, a base station, or a server.

Clause 7. The method of clause 6, further comprising transmitting an on-demand request for radio frequency sensing operations, wherein the radio frequency sensing configuration information is received in response to transmitting the on-demand request.

Clause 8. The method of clause 1, further comprising providing capability information indicating one or more capabilities of a wireless node that are associated with performing radio frequency sensing.

Clause 9. A method for transmitting a radio frequency sensing signal based on a time reversal precoding, comprising: receiving a radio frequency reference signal; determining a time reversing precoding based on a channel associated with the radio frequency reference signal; generating a time reversed radio frequency sensing signal based at least in part on the time reversing precoding; and transmitting the time reversed radio frequency sensing signal.

Clause 10. The method of clause 9, wherein the radio frequency reference signal is one of a sounding reference signal (SRS), a demodulation reference signal (DMRS), a phase tracking reference signal (PTRS), a positioning reference signal (PRS), a channel state information reference signal (CSI-RS), a primary synchronization signal (PSS), and a secondary synchronization signal (SSS).

Clause 11. The method of clause 9, wherein the time reversing precoding is based on a time reversed channel impulse response associated with the radio frequency reference signal.

Clause 12. The method of clause 9, wherein the time reversing precoding is a time reversing filter in a frequency domain.

Clause 13. The method of clause 9, wherein determining the time reversing precoding include receiving channel information from a network entity, wherein the network entity includes one of a mobile device, a base station, or a server.

Clause 14. The method of clause 9, further comprising: receiving a plurality of radio frequency reference signals from a plurality of wireless nodes, wherein each of the plurality of radio frequency reference signals is associated with different channels; determining a plurality of time reversing precoding based on the different channels associated with the plurality of radio frequency reference signals; and generating a plurality of time reversed radio frequency sensing signals based at least in part on the plurality of time reversing precoding.

Clause 15. The method of clause 9, wherein the radio frequency reference signal is received by a user equipment, and the time reversed radio frequency sensing signal is transmitted by the user equipment.

Clause 16. The method of clause 9, wherein the radio frequency reference signal is received by a base station, and the time reversed radio frequency sensing signal is transmitted by the base station.

Clause 17. The method of clause 9, further comprising receiving radio frequency sensing configuration information from a network entity, wherein transmitting the time reversed radio frequency sensing signal is based at least in part on the radio frequency sensing configuration information.

Clause 18. The method of clause 17, further comprising transmitting an on-demand request to the network entity, and receiving the radio frequency sensing configuration information in response to transmitting the on-demand request.

Clause 19. A method for performing radio frequency sensing operations, comprising: transmitting a radio frequency reference signal; receiving channel information associated with the radio frequency reference signal; generating a time reversed radio frequency sensing signal based at least in part on the channel information; and transmitting the time reversed radio frequency sensing signal.

Clause 20. The method of clause 19, wherein the radio frequency reference signal is one of a sounding reference signal (SRS), a demodulation reference signal (DMRS), a phase tracking reference signal (PTRS), a positioning reference signal (PRS), a channel state information reference signal (CSI-RS), a primary synchronization signal (PSS), and a secondary synchronization signal (SSS).

Clause 21. The method of clause 19, wherein the channel information is a channel impulse response associated with the radio frequency reference signal.

Clause 22. The method of clause 19, wherein the channel information is received from a network entity, wherein the network entity includes one of a mobile device, a base station, or a server.

Clause 23. The method of clause 19, further comprising: receiving channel information for a plurality of different channels; and generating a plurality of time reversed radio frequency sensing signals based at least in part on the channel information for the plurality of different channels.

Clause 24. The method of clause 19, wherein the radio frequency reference signal and the time reversed radio frequency sensing signal are transmitted by a mobile device.

Clause 25. The method of clause 19, wherein the radio frequency reference signal and the time reversed radio frequency sensing signal are transmitted by a base station.

Clause 26. An apparatus, comprising: at least one memory; at least one transceiver; at least one processor communicatively coupled to the at least one memory and the at least one transceiver, and configured to: transmit a radio frequency sensing signal; receive an echo of the radio frequency sensing signal; reverse the echo of the radio frequency sensing signal received; normalize an energy of a reversed echo of the radio frequency sensing signal; and transmit a normalized reversed echo of the radio frequency sensing signal.

Clause 27. The apparatus of clause 26, wherein the radio frequency sensing signal is a frequency modulated continuous wave signal and the at least one processor is further configured to stretch process the echo by combining the echo with a replica of the radio frequency sensing signal.

Clause 28. The apparatus of clause 27, wherein the at least one processor is further configured to generate a time reversed beat signal corresponding to a phase conjugation in a spatial frequency domain for the radio frequency sensing signal.

Clause 29. The apparatus of clause 26, wherein the at least one processor is further configured to reverse a received waveform in a time domain.

Clause 30. The apparatus of clause 26, wherein the at least one processor is further configured to perform a power amplification of the echo of the radio frequency sensing signal.

Clause 31. The apparatus of clause 26, wherein the at least one processor is further configured to receive radio frequency configuration information from a network entity, wherein the network entity includes one of a mobile device, a base station, or a server.

Clause 32. The apparatus of clause 31, wherein the at least one processor is further configured to transmit an on-demand request for radio frequency sensing operations, wherein the radio frequency sensing configuration information is received in response to transmitting the on-demand request.

Clause 33. The apparatus of clause 26, wherein the at least one processor is further configured to provide capability information indicating one or more capabilities of a wireless node that are associated with performing radio frequency sensing.

Clause 34. An apparatus, comprising: at least one memory; at least one transceiver; at least one processor communicatively coupled to the at least one memory and the at least one transceiver, and configured to: receive a radio frequency reference signal; determine a time reversing precoding based on a channel associated with the radio frequency reference signal; generate a time reversed radio frequency sensing signal based at least in part on the time reversing precoding; and transmit the time reversed radio frequency sensing signal.

Clause 35. The apparatus of clause 34, wherein the radio frequency reference signal is one of a sounding reference signal (SRS), a demodulation reference signal (DMRS), a phase tracking reference signal (PTRS), a positioning reference signal (PRS), a channel state information reference signal (CSI-RS), a primary synchronization signal (PSS), and a secondary synchronization signal (SSS).

Clause 36. The apparatus of clause 34, wherein the time reversing precoding is based on a time reversed channel impulse response associated with the radio frequency reference signal.

Clause 37. The apparatus of clause 34, wherein the time reversing precoding is a time reversing filter in a frequency domain.

Clause 38. The apparatus of clause 34, wherein the at least one processor is further configured to receive channel information from a network entity, wherein the network entity includes one of a mobile device, a base station, or a server.

Clause 39. The apparatus of clause 34, wherein the at least one processor is further configured to: receive a plurality of radio frequency reference signals from a plurality of wireless nodes, wherein each of the plurality of radio frequency reference signals is associated with different channels; determine a plurality of time reversing precoding based on the different channels associated with the plurality of radio frequency reference signals; and generate a plurality of time reversed radio frequency sensing signals based at least in part on the plurality of time reversing precoding.

Clause 40. The apparatus of clause 34, wherein the at least one processor is further configured to receive radio frequency sensing configuration information from a network entity, and to transmit the time reversed radio frequency sensing signal based at least in part on the radio frequency sensing configuration information.

Clause 41. The apparatus of clause 40, wherein the at least one processor is further configured to transmit an on-demand request to the network entity, and receive the radio frequency sensing configuration information in response to transmitting the on-demand request.

Clause 42. An apparatus, comprising: at least one memory; at least one transceiver; at least one processor communicatively coupled to the at least one memory and the at least one transceiver, and configured to: transmit a radio frequency reference signal; receive channel information associated with the radio frequency reference signal; generate a time reversed radio frequency sensing signal based at least in part on the channel information; and transmit the time reversed radio frequency sensing signal.

Clause 43. The apparatus of clause 42, wherein the radio frequency reference signal is one of a sounding reference signal (SRS), a demodulation reference signal (DMRS), a phase tracking reference signal (PTRS), a positioning reference signal (PRS), a channel state information reference signal (CSI-RS), a primary synchronization signal (PSS), and a secondary synchronization signal (SSS).

Clause 44. The apparatus of clause 42, wherein the channel information is a channel impulse response associated with the radio frequency reference signal.

Clause 45. The apparatus of clause 42, wherein the at least one processor is further configured to receive the channel information from a network entity, wherein the network entity includes one of a mobile device, a base station, or a server.

Clause 46. The apparatus of clause 42, wherein the at least one processor is further configured to: receive channel information for a plurality of different channels; and generate a plurality of time reversed radio frequency sensing signals based at least in part on the channel information for the plurality of different channels.

Clause 47. An apparatus for transmitting a time reversed radio frequency sensing signal for monostatic radio frequency sensing operations, comprising: means for transmitting a radio frequency sensing signal; means for receiving an echo of the radio frequency sensing signal; means for reversing the echo of the radio frequency sensing signal received; means for normalizing an energy of a reversed echo of the radio frequency sensing signal; and means for transmitting a normalized reversed echo of the radio frequency sensing signal.

Clause 48. An apparatus for transmitting a radio frequency sensing signal based on a time reversal precoding, comprising: means for receiving a radio frequency reference signal; means for determining a time reversing precoding based on a channel associated with the radio frequency reference signal; means for generating a time reversed radio frequency sensing signal based at least in part on the time reversing precoding; and means for transmitting the time reversed radio frequency sensing signal.

Clause 49. An apparatus for performing radio frequency sensing operations, comprising: means for transmitting a radio frequency reference signal; means for receiving channel information associated with the radio frequency reference signal; means for generating a time reversed radio frequency sensing signal based at least in part on the channel information; and means for transmitting the time reversed radio frequency sensing signal.

Clause 50. A non-transitory processor-readable storage medium comprising processor-readable instructions configured to cause one or more processors to transmit a time reversed radio frequency sensing signal for monostatic radio frequency sensing operations, comprising code for: transmitting a radio frequency sensing signal; receiving an echo of the radio frequency sensing signal; reversing the echo of the radio frequency sensing signal received; normalizing an energy of a reversed echo of the radio frequency sensing signal; and transmitting a normalized reversed echo of the radio frequency sensing signal.

Clause 51. A non-transitory processor-readable storage medium comprising processor-readable instructions configured to cause one or more processors to transmit a radio frequency sensing signal based on a time reversal precoding, comprising code for: receiving a radio frequency reference signal; determining a time reversing precoding based on a channel associated with the radio frequency reference signal; generating a time reversed radio frequency sensing signal based at least in part on the time reversing precoding; and transmitting the time reversed radio frequency sensing signal.

Clause 52. A non-transitory processor-readable storage medium comprising processor-readable instructions configured to cause one or more processors to perform radio frequency sensing operations, comprising code for: transmitting a radio frequency reference signal; receiving channel information associated with the radio frequency reference signal; generating a time reversed radio frequency sensing signal based at least in part on the channel information; and transmitting the time reversed radio frequency sensing signal.

What is claimed is:

1. A method for transmitting a time reversed radio frequency sensing signal for monostatic radio frequency sensing operations, comprising:
   transmitting a capability message indicating a required time gap between an initial signal transmission and a time-reversed signal transmission;
   receiving radio frequency sensing configuration information based on the capability message;
   transmitting a radio frequency sensing signal in accordance with the radio frequency sensing configuration information;
   receiving an echo of the radio frequency sensing signal;
   reversing the echo of the radio frequency sensing signal received;
   normalizing an energy of a reversed echo of the radio frequency sensing signal; and
   transmitting a normalized reversed echo of the radio frequency sensing signal in accordance with the radio frequency sensing configuration information.

2. The method of claim 1, wherein the radio frequency sensing signal is a frequency modulated continuous wave signal and the reversing the echo of the radio frequency sensing signal received includes stretch processing the echo by combining the echo with a replica of the radio frequency sensing signal.

3. The method of claim 2, wherein the reversing the echo of the radio frequency sensing signal further includes generating a time reversed beat signal corresponding to a phase conjugation in a spatial frequency domain for the radio frequency sensing signal.

4. The method of claim 1, wherein the reversing the echo of the radio frequency sensing signal received includes reversing a received waveform in a time domain.

5. The method of claim 1, wherein normalizing the energy of the echo of the radio frequency sensing signal received includes performing a power amplification of the echo of the radio frequency sensing signal.

6. The method of claim 1, wherein the radio frequency sensing configuration information is received from a network entity, wherein the network entity includes one of a mobile device, a base station, or a server.

7. The method of claim 6, further comprising transmitting an on-demand request for radio frequency sensing operations, wherein the radio frequency sensing configuration information is received in response to transmitting the on-demand request.

8. The method of claim 1, further comprising providing capability information indicating one or more capabilities of a wireless node that are associated with performing radio frequency sensing.

9. The method of claim 1, wherein the radio frequency sensing configuration information includes a first resource allocation for the radio frequency sensing signal, a signal configuration for the radio frequency sensing signal, and a second resource allocation for the normalized reversed echo of the radio frequency sensing signal.

10. An apparatus, comprising:
    at least one memory;

at least one transceiver;

at least one processor communicatively coupled to the at least one memory and the at least one transceiver, and configured to:

transmit a capability message indicating a required time gap between an initial signal transmission and a time-reversed signal transmission;

receive radio frequency sensing configuration information based on the capability message;

transmit a radio frequency sensing signal in accordance with the radio frequency sensing configuration information;

receive an echo of the radio frequency sensing signal;

reverse the echo of the radio frequency sensing signal received;

normalize an energy of a reversed echo of the radio frequency sensing signal; and transmit a normalized reversed echo of the radio frequency sensing signal in accordance with the radio frequency sensing configuration information.

11. The apparatus of claim 10, wherein the radio frequency sensing signal is a frequency modulated continuous wave signal and the at least one processor is further configured to stretch process the echo by combining the echo with a replica of the radio frequency sensing signal.

12. The apparatus of claim 11, wherein the at least one processor is further configured to generate a time reversed beat signal corresponding to a phase conjugation in a spatial frequency domain for the radio frequency sensing signal.

13. The apparatus of claim 10, wherein the at least one processor is further configured to reverse a received waveform in a time domain.

14. The apparatus of claim 10, wherein the at least one processor is further configured to perform a power amplification of the echo of the radio frequency sensing signal.

15. The apparatus of claim 10, wherein the at least one processor is further configured to receive the radio frequency sensing configuration information from a network entity, wherein the network entity includes one of a mobile device, a base station, or a server.

16. The apparatus of claim 10, wherein the radio frequency sensing configuration information includes a first resource allocation for the radio frequency sensing signal, a signal configuration for the radio frequency sensing signal, and a second resource allocation for the normalized reversed echo of the radio frequency sensing signal.

* * * * *